(12) United States Patent
Solmer et al.

(10) Patent No.: US 8,548,951 B2
(45) Date of Patent: Oct. 1, 2013

(54) METHOD AND SYSTEM FOR UNIFIED INFORMATION REPRESENTATION AND APPLICATIONS THEREOF

(75) Inventors: Robert Solmer, San Diego, CA (US); Wen Ruan, Manlius, NY (US)

(73) Assignee: Textwise LLC, Rochester, NY (US)

( * ) Notice: Subject to any disclaimer, the term of this patent is extended or adjusted under 35 U.S.C. 154(b) by 69 days.

(21) Appl. No.: 13/044,763

(22) Filed: Mar. 10, 2011

(65) Prior Publication Data

US 2012/0233127 A1    Sep. 13, 2012

(51) Int. Cl.
*G06F 7/00* (2006.01)
*G06F 17/00* (2006.01)
*G06F 17/30* (2006.01)

(52) U.S. Cl.
CPC ...... *G06F 17/30073* (2013.01); *G06F 17/3069* (2013.01); *G06F 2212/454* (2013.01)
USPC ........... 707/661; 707/737; 707/738; 707/758; 707/780; 704/9

(58) Field of Classification Search
CPC .......... G06F 17/30073; G06F 17/3069; G06F 2212/454
USPC ............. 707/661, 737, 738, 758, 780; 704/9
See application file for complete search history.

(56) References Cited

U.S. PATENT DOCUMENTS

| | | | | |
|---|---|---|---|---|
| 5,237,503 | A | * | 8/1993 | Bedecarrax et al. ............ 704/10 |
| 5,325,298 | A | * | 6/1994 | Gallant ............................ 704/9 |
| 5,619,709 | A | * | 4/1997 | Caid et al. ..................... 715/209 |
| 5,873,056 | A | * | 2/1999 | Liddy et al. ....................... 704/9 |
| 5,963,940 | A | * | 10/1999 | Liddy et al. ............ 707/999.005 |
| 6,006,221 | A | * | 12/1999 | Liddy et al. ............ 707/999.005 |
| 6,026,388 | A | * | 2/2000 | Liddy et al. ............ 707/999.005 |
| 6,269,368 | B1 | * | 7/2001 | Diamond ............... 707/999.003 |
| 6,523,026 | B1 | * | 2/2003 | Gillis ..................... 707/999.003 |
| 7,937,389 | B2 | * | 5/2011 | Jiao et al. ....................... 707/736 |
| 2003/0018470 | A1 | * | 1/2003 | Golden et al. .................. 704/10 |
| 2004/0083092 | A1 | * | 4/2004 | Valles ............................... 704/9 |
| 2004/0249809 | A1 | | 12/2004 | Ramani et al. |
| 2008/0195601 | A1 | | 8/2008 | Ntoulas et al. |
| 2009/0119343 | A1 | * | 5/2009 | Jiao et al. ..................... 707/200 |

OTHER PUBLICATIONS

International Search Report corresponding to PCT/US11/27885 dated May 6, 2011.

* cited by examiner

*Primary Examiner* — Phong Nguyen
(74) *Attorney, Agent, or Firm* — Dentons US LLP

(57) ABSTRACT

Method, system, and programs for information search and retrieval. A query is received and is processed to generate a feature-based vector that characterizes the query. A unified representation is then created based on the feature-based vector, that integrates semantic and feature based characterizations of the query. Information relevant to the query is then retrieved from an information archive based on the unified representation of the query. A query response is generated based on the retrieved information relevant to the query and is then transmitted to respond to the query.

31 Claims, 15 Drawing Sheets

Exemplary flowchart for generating a Unified Representation

Traditional approach of representing an input document using keywords

Traditional approach of representing an input document based on semantics

Invention: integrating different representations in a unified and complementary manner This figure shows how some parts (residual keywords and blurred feature vector) of the unified representation is dependent on some part (semantic code) of the representation Exemplary system diagram of generating a Unified Representation Exemplary flowchart for generating a Unified Representation Exemplary system diagram of training an autoencoder (not needed for invention)

Exemplary system diagram when autoencoder is used for generating semantic code in creating unified representations Exemplary system diagram for utilizing unified representation for search/retrieval/query Exemplary flowchart for utilizing unified representation for search/retrieval/query Exemplary system diagram for generating a unified representation for a query Exemplary flowchart for generating a unified representation for a query Distributed, self-evolving
information retrieval system General computer architecture on which the invention can be implemented.

METHOD AND SYSTEM FOR UNIFIED INFORMATION REPRESENTATION AND APPLICATIONS THEREOF

BACKGROUND

1. Technical Field

The present teaching relates to methods, systems and programming for data processing. Particularly, the present teaching is directed to methods, systems, and programming for digital data characterization and systems incorporating the same.

2. Discussion of Technical Background

The advancement in the world of the Internet has made it possible to make a tremendous amount of information accessible to users located anywhere in the world. With the explosion of information, new issues have arisen. First, faced with all the information available, how to efficiently and effectively identify data of interest poses a serious challenge. Much effort has been put in organizing the vast amount of information to facilitate the search for information in a more systematic manner. Along that line, different techniques have been developed to classify content into meaningful categories in order to facilitate subsequent searches or queries. Imposing organization and structure on content has made it possible to achieve more meaningful searches and promoted more targeted commercial activities.

In addition to categorizing content, efforts have been made to seek effective representation of data so that processing related to searches and/or queries can be made more efficient in order to identify what a user is asking for. For example, in the context of textual data, traditional information retrieval (IR) systems rely on matching specific keywords in a query to those in the documents to find the most relevant documents in a collection. This is shown in FIG. 1(a) (Prior Art), where an input document 110 is analyzed by a keyword extractor 120 that produces a keywords-based representation of the input document 110. There are a number of well-known retrieval models associated with keyword based approaches, including vector space models, probabilistic models, and language models. Language model based IR approaches include the use of, e.g., unigram, bi-gram, N-gram, or topics. Although such language model based approaches have attracted much attention in the IR field, they have various limitations. In practice, use of a language model that is more complex than a simple unigram-based model is often constrained due to computational complexity. Another drawback associated with a traditional keyword based approach is related to synonymy and polysemy of keywords.

In an attempt to mitigate these drawbacks in connection with keywords-based approaches, data representation and search based on semantics of an input document have been developed. In semantic based systems, the focus has shifted from keywords to the meaning of a document. This is depicted in FIG. 1(b) (Prior Art), where an input document 160 is analyzed first by a feature extractor 170 that produces a feature vector. The feature vector is then forwarded from the feature extractor 170 to a semantic estimator 180, which analyzes the input data and determines the semantics of the input document. The semantic estimator produces a semantic-based representation of the input document 160. Such semantic-based representation can be stored and used in future searches. In implementing the semantic estimator 180, natural language processing techniques have been employed to understand the meaning of each term in queries and documents.

Such techniques sometimes use taxonomies or ontological resources in order to achieve more accurate results. The enormous effort involved in such systems prompted development of automated methods that can learn the meaning of terms or documents from a document collection. For example, a so-called autoencoder (known in the art) has been developed for learning and subsequently extracting semantics of a given document. Such an autoencoder may be deployed to implement the semantic estimator 180. In this case, an autoencoder takes the feature vector shown in FIG. 1(b) as an input and then identifies the most relevant features that represent the semantics of the input document 160.

An autoencoder uses an artificial neural network for learning an efficient coding. By learning a compressed representation for a set of data, an autoencoder provides a means for dimensionality reduction and feature extraction. The concept of autoencoder was originally used for imaging compression and decompression. Recently, it has been adopted for and applied to textual information to learn the semantic features in a text collection. The compact semantic codes output from an autoencoder can be used both to represent the underlying textual information and to identify similar documents. Due to the fact that the input dimensionality of the autoencoder must be limited to make training tractable, only a small subset of the corpus vocabulary can be used to contribute to the semantic codes. Because of that, the semantic codes output from an autoencoder may not adequately capture the semantics of an input document. In addition, document collections in many retrieval applications are often updated more often than training can practically be done due to the computational cost of training. These limitations raise the question of whether the resulting condensed semantic code provides a sufficiently accurate representation of the information in the original feature space.

Another existing automated technique, called Trainable Semantic Vectors (TSV), learns the meaning of each term extracted from a document collection with regard to a pre-defined set of categories or topics, and creates a semantic vector for each document. Such generated semantic vector can then be used to find similar documents. However, TSV is a supervised learning technique, which requires pre-categorized documents in order to properly train the TSV to obtain a semantic representation model for each term.

Another automated method called Latent Semantic Indexing (LSI) identifies latent semantic structures in a text collection using an unsupervised statistical learning technique that can be based on Singular Value Decomposition (SVD). Major developments along the same line include probabilistic Latent Semantic Indexing (pLSI) and Latent Dirichlet Allocation (LDA). Those types of approaches create a latent semantic space to represent both queries and documents, and use the latent semantic representation to identify relevant documents. The computational cost of these approaches prohibits the use of a higher dimensionality in the semantic space and, hence, limits its ability to learn effectively from a data collection.

The above mentioned prior art solutions all have limitations in practice. Therefore, there is a need to develop an approach that addresses those limitations and provides improvements.

SUMMARY

The teachings disclosed herein relate to methods, systems, and programming for content processing. More particularly, the present teaching relates to methods, systems, and programming for heterogeneous data management.

In one example, a method, implemented on a machine having at least one processor, storage, and a communication platform connected to a network for data archiving. Data is received via the communication platform and is analyzed, by a feature extractor, in accordance with at least one model to form a feature-based vector characterizing the data. A semantic-based representation of the data is then generated based on the feature-based vector and a reconstruction of the feature-based vector is created based on the semantic-based representation of the data. One or more residual features are then identified to form a residual feature-based representation of the data where the one or more residual features are selected based on a comparison between the feature-based vector and the reconstructed feature-based vector. A unified data representation is then created based on the semantic-based representation and the residual feature-based representation. The data is archived based on its unified representation.

In another example, a method, implemented on a machine having at least one processor, storage, and a communication platform connected to a network, for data archiving is described. Data received via the communication platform is analyzed based on at least one model to generate a feature-based vector characterizing the data. A semantic-based representation of the data is then generated based on the feature-based vector and a reconstruction of the feature-based vector is created based on the semantic-based representation of the data. A blurred feature-based representation is created by modifying the feature-based vector based on the reconstructed feature-based vector and a unified data representation can be created based on the blurred feature-based representation. Data is then archived in accordance with the unified data representation.

In a different example, a method, implemented on a machine, having at least one processor, storage, and a communication platform connected to a network, for information search and retrieval is disclosed. A query is received via the communication platform and is processed to extract a feature-based vector characterizing the query. A unified representation for the query is created based on the feature-based vector, wherein the unified query representation integrates semantic and feature based characterizations of the query. Information relevant to the query is then retrieved from an information archive based on the unified representation for the query, from which a query response is identified from the information relevant to the query. Such identified query response is then transmitted to respond to the query.

In a different example, a system for generating a unified data representation is disclosed, which comprises a communication platform through which data can be received, a feature extractor configured for analyzing the received data in accordance with at least one model to form a feature-based vector characterizing the data, a semantic extractor configured for generating a semantic-based representation of the data based on the feature-based vector, a reconstruction unit configured for producing a reconstructed feature-based vector based on the semantic-based representation of the data, a residual feature identifier configured for forming a residual feature-based representation of the data based on one or more residual features identified in accordance with a comparison between the feature-based vector and the reconstructed feature-based vector, and a unified representation construction unit configured for generating a unified representation for the data based on the semantic-based representation and the residual feature-based representation.

In another example, a system for generating a unified data representation is disclosed, which comprises a communication platform for obtaining a query and transmitting a query response, a query processor configured for processing the query to generate a feature-based vector characterizing the query, a query representation generator configured for generating a unified representation for the query based on the feature-based vector, wherein the unified representation integrates semantic and feature based characterizations of the query, a candidate search unit configured for retrieving information relevant to the query from an information archive based on the unified representation for the query, and a query response generator configured for generating the query response based on the information relevant to the query retrieved from the information archive and transmitting the query response to respond to the query.

Other concepts relate to software for implementing unified representation creation and applications. A software product, in accord with this concept, includes at least one machine-readable non-transitory medium and information carried by the medium. The information tarried by the medium may be executable program code data regarding parameters in association with a request or operational parameters, such as information related to a user, a request, or a social group, etc.

In one example, a machine readable and non-transitory medium having information recorded thereon for data archiving, the information, when read by the machine, causes the machine to perform the following sequence of steps. When data is received, it is analyzed in accordance with one or more models to extract feature-based vector characterizing the data. Based on the feature-based vector, a semantic-based representation is generated for the data that captures the semantics of the data. A reconstruction of the feature-based vector is created in accordance with the semantic-based data representation and a residual feature-based representation can be generated in accordance with one or more residual features selected based on a comparison between the feature-based vector and the reconstructed feature-based vector. A unified data representation can then be generated based on the semantic-based representation and the residual-based representation and is used to archive the data in an information archive.

In another example, a machine readable and non-transitory medium having information recorded thereon for data archiving, the information, when read by the machine, causes the machine to perform the following sequence of steps. Data received is analyzed in accordance with at least one model to extract a feature-based vector characterizing the data, based on which a semantic-based representation is created for the data that captures the semantics of the data. A reconstructed feature-based vector is then generated based on the semantic-based representation and a blurred feature-based representation for the data is then formed by modifying the feature-based vector based on the reconstructed feature-based vector and is used to generate a unified data representation. The data is then archived in an information archive based on the unified representation.

In yet another different example, a machine readable and non-transitory medium having information recorded thereon for information search and retrieval, the information, when read by the machine, causes the machine to perform the following sequence of steps. A query is received via a communication platform and is processed to generate a feature-based vector characterizing the query. A unified representation is created for the query based on the feature-based vector, where the unified representation integration semantic and feature based characterizations of the query. Information relevant to the query is then searches and retrieved from an information archive based on the unified query representation. Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Figure 1A:
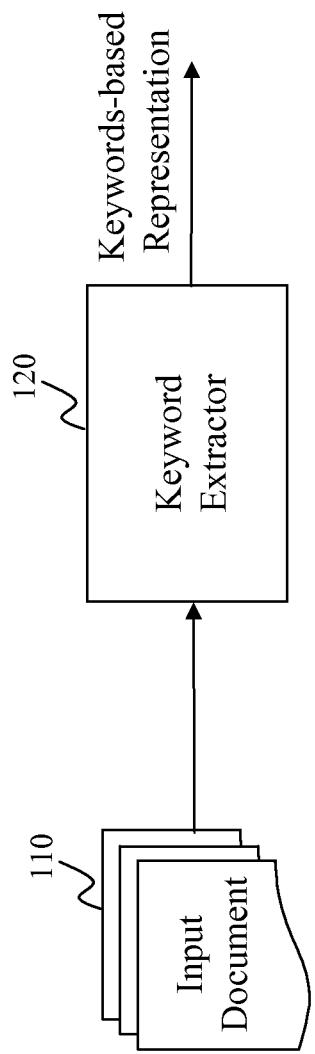
FIGS. 1(a) and 1(b) (Prior Art) describe conventional approaches to characterizing a data set.
Figure 1B:
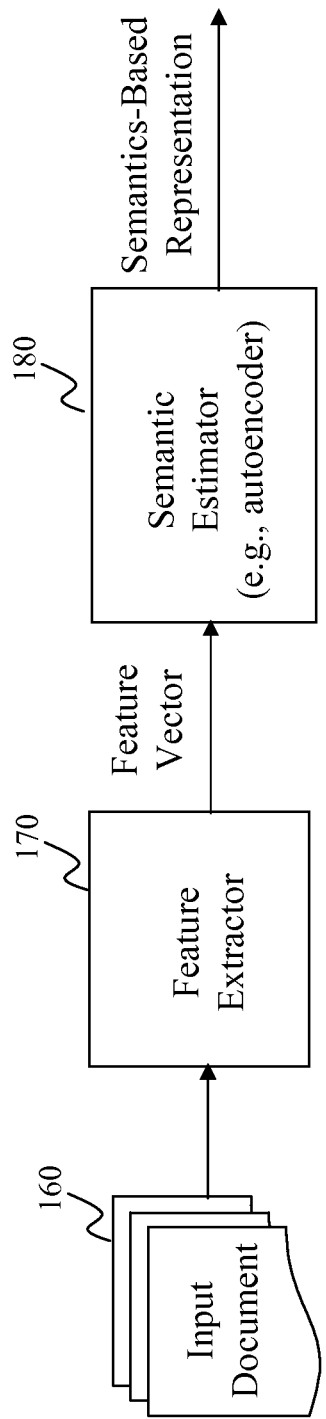
Figure 2A:
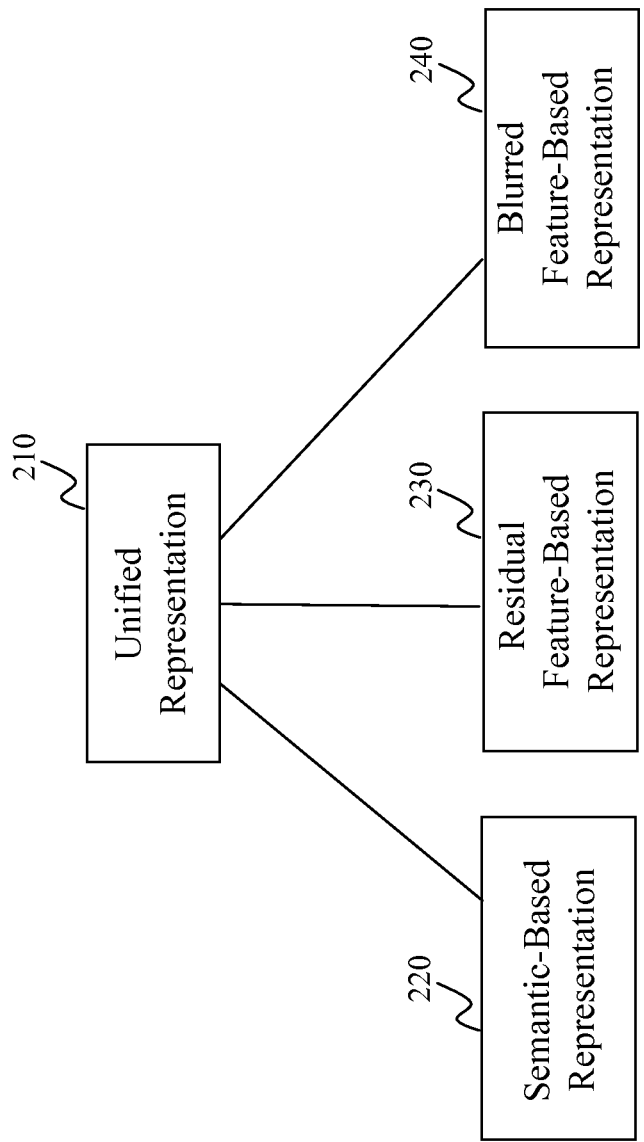
FIG. 2(a) depicts a unified representation having one or more components, according to an embodiment of the present teaching.

The present disclosure describes method, system, and programming aspects of generating a unifier representation for data, its implementation, and applications in information processing. The method and system as disclosed herein aim at providing an information representation that adequately characterizes the underlying information in a more tractable manner and allows dynamic variations adaptive to different types of information. FIG. 2(a) depicts a unified representation 210 that has one or more components or sub-representations, according to an embodiment of the present teaching. Specifically, the unified representation 210 may include one or more of a semantic-based representation 220, a residual feature-based representation 230, and a blurred feature-based representation 240. In any particular instantiation of the unified representation 210, one or more components or sub-representations may be present. Each sub-representation (or component) may be formed to characterize the underlying information in terms of some aspects of the information. For example, the semantic-based representation 220 may be used to characterize the underlying information in terms of semantics. The residual feature-based representation 230 may be used to complement what is not captured by the semantic-based representation 220 and therefore, it may not be used as a replacement for the semantic-based characterization. The blurred feature-based representation 240 may also be used to capture something that neither the semantic-based representation 220 nor the residual feature-based representation 230 is able to characterize.

Figure 2B:
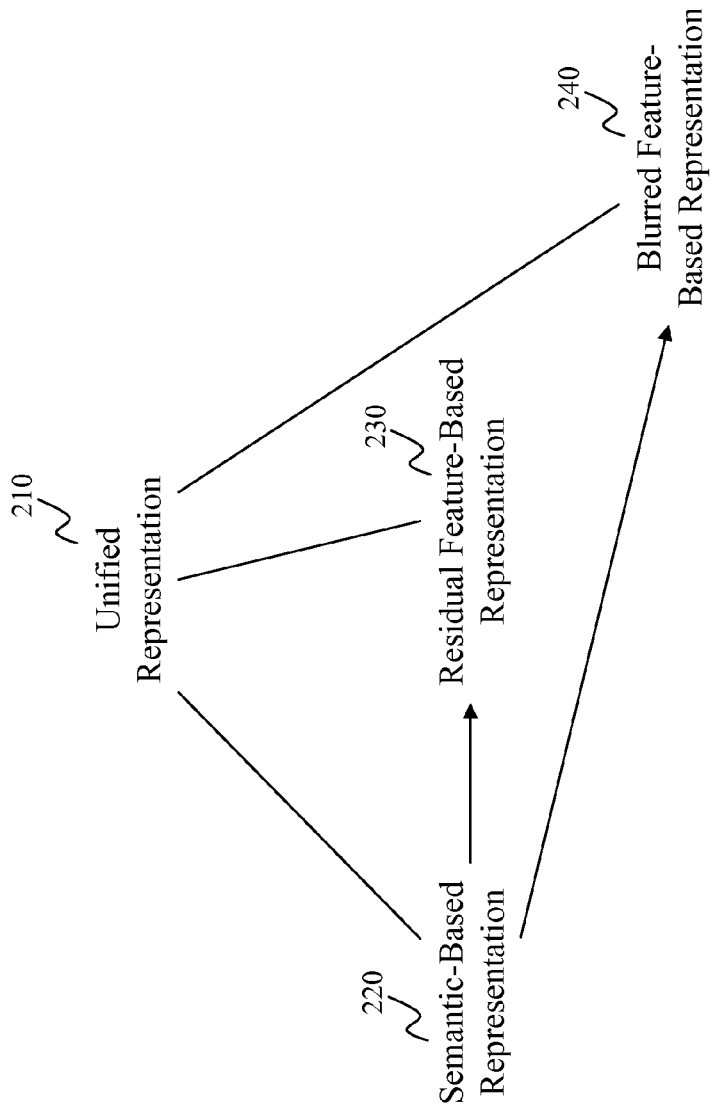
FIG. 2(b) depicts the inter-dependency relationships among one or more components in a unified representation, according to an embodiment of the present teaching.

Although components 220-240 may or may not all be present in any particular instantiation of a unified representation, there may be some dependency relationships among these components. This is illustrated in FIG. 2(b), which depicts the inter-dependency relationships among the components of the unified representation 210, according to an embodiment of the present teaching. In this illustration, the residual feature-based representation 230 is dependent on the semantic-based representation 220. That is, the residual feature-based representation 230 exists only if the semantic-based representation 220 exists. In addition, the blurred feature-based representation 240 also depends on the existence of the semantic-based representation 220.

The dependency relationships among component representations may manifest in different ways. For example, as the name implies, the residual feature-based representation 230 may be used to compensate what another component representation, e.g., the semantic-based representation, does not capture. In this case, the computation of the residual feature-based representation relies on the semantic-based representation in order to determine what to supplement based on what is lacking in the semantic-based representation. Similarly, the blurred feature-based representation may be used to compensate or supplement if either or both the semantic-based representation and residual feature-based representation do not adequately characterize the underlying information. In some embodiments, the dependency relationship between some of the component representations may not exist at all. For example, the blurred feature-based representation may exist independent of the semantic-based and the residual feature based representations. Although the present discussion discloses exemplary inter-dependency relationships among component representations, it is understood that such embodiments serve merely as illustrations rather than limitations.

Figure 3A:
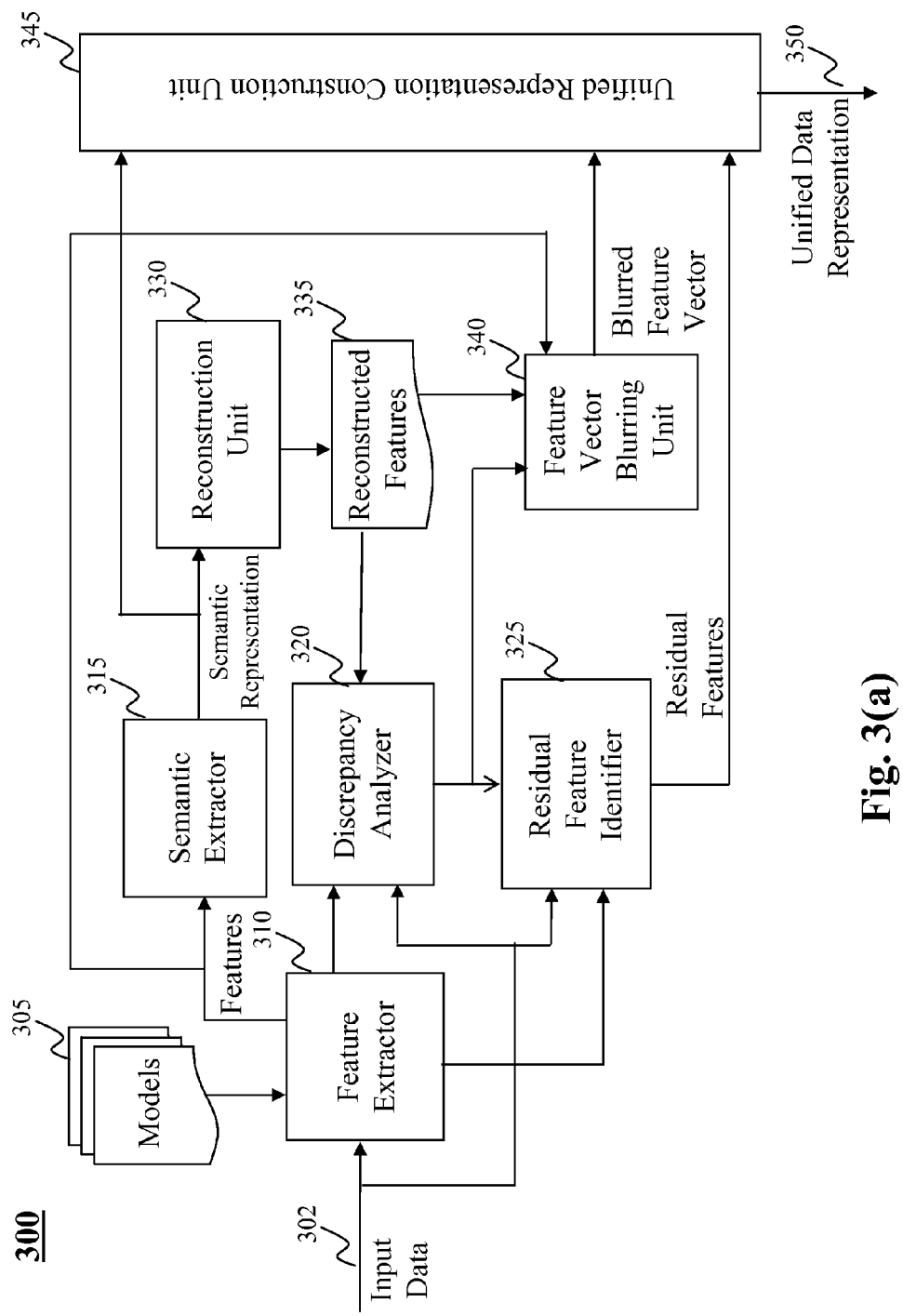
FIG. 3(a) depicts a high level diagram of an exemplary system for generating a unified representation of data, according to an embodiment of the present teaching.

FIG. 3(a) depicts a high level diagram of an exemplary system 300 for generating a unified representation of certain information, according to an embodiment of the present teaching. In the exemplary embodiments disclosed herein, the system 300 handles the generation of a unified representation 350 for input data 302 based on the inter-dependency relationships among component representations as depicted in FIG. 2(b). As discussed herein, other relationships among component representations are also possible, which are all within the scope of the present teaching. As illustrated, the system 300 comprises a feature extractor 310, a semantic extractor 315, a reconstruction unit 330, a discrepancy analyzer 320, a residual feature identifier 325, a feature vector blurring unit 340, and a unified representation construction unit 345. In operation, the feature extractor 310 identifies various features from the input data 302 in accordance with one or more models stored in storage 305. Such models may include one or more language models established, e.g., based on a corpus, that specify a plurality of features that can be extracted from the input data 302.

The storage 305 may also store other models that may be used by the feature extractor 310 to determine what features are to be computed and how such features may be computed. For example, an information model accessible from storage 305 may specify how to compute an information allocation vector or information representation based on features (e.g., unigram features, bi-gram features, or topic features) extracted from the input data 302. Such computed information allocation vector can be used as the input features to the semantic extractor 315. In a co-pending patent application by the same inventors, entitled "Method and System For Information Modeling and Applications Thereof" incorporated herein by reference, details in connection with the information model and its application in constructing an information representation of an input data are disclosed.

As described in the co-pending application, an information model can be used, e.g., by the feature extractor 310, to generate an information representation of the input data 302. In this information representation, there are multiple attributes, each of which is associated with a specific feature identified based on, e.g., a language model. The value of each attribute in this information representation represents an allocation of a portion of the total information contained in the underlying input data to a specific feature corresponding to the attribute. The larger the portion is, the more important the underlying feature is in characterizing the input data. In general, a large number of attributes have a zero or near zero allocation, i.e., most features are not that important in characterizing the input data.

When an information model is used by the feature extractor 310, the output of the feature extractor 310 is an information representation of the input data. As detailed in the co-pending application, such an information representation for input data 302 provides a platform for coherently combining different feature sets, some of which may be heterogeneous in nature. In addition, such an information representation provides a uniform way to identify features that do not attribute much information to a particular input data (the attributes corresponding to such features have near zero or zero information allocation). Therefore, such an information representation also leads to effective dimensionality reduction across all features to be performed by, e.g., the semantic extractor 315, in a uniform manner.

Based on the input features (which can be a feature vector in the conventional sense or an information representation as discussed above), the semantic extractor 315 generates the semantic-based representation 220, which may comprise features that are considered to be characteristic in terms of describing the semantics of the input data 302. The semantic-based representation in general has a lower dimension than that of the input features. The reduction in dimensionality may be achieved when the semantic extractor 315 identifies only a portion of the input features that are characteristic in describing the semantics of the input data. This reduction may be achieved in different ways. In some embodiments, if the input to the semantic extractor 315 already weighs features included in a language model, the semantic extractor 315 may ignore features that have weights lower than a given threshold. In some embodiments, the semantic extractor 315 identifies features that are characteristic to semantics of the input data based on learned experience or knowledge (in this case, the semantic extractor is trained prior to be used in actual operation). In some embodiments, a combination of utilizing weights and learned knowledge makes the semantic extractor 315 capable of selecting relevant features.

In the illustrated system 300, the semantic-based representation is then used by the reconstruction unit 330 to reconstruct the feature vector that is input to the semantic extractor 315. The reconstruction unit 330 generates reconstructed features 335. Depending on the quality of the semantic-based representation, the quality of the reconstructed features varies. In general, the better the semantic-based representation (i.e., accurately describes the semantics of the input data), the higher quality the reconstructed features are (i.e., the reconstructed features are close to the input features to the semantic extractor 315). When there is a big discrepancy between the input features and the reconstructed features, it usually indicates that some features that are actually important in describing or characteristic to the semantics of the input data are somehow not captured by the semantic-based representation. This is determined by the discrepancy analyzer 320. The discrepancy may be determined using any technologies that can be used to assess how similar two features vectors are. For example, a conventional Euclidian distance between the input feature vector (to the semantic extractor 315) and the reconstructed feature vector 335, may be computed in a high dimensional space where both feature vectors reside. As another example, an angle between the two feature vectors may be computed to assess the discrepancy. The method to be used to determine the discrepancy may be determined based on the nature of the underlying applications.

In some embodiments, depending on the assessed discrepancy between the input feature vector and the reconstructed feature vector, other component representations may be generated. In system 300 shown in FIG. 3(a), depending on the result of the discrepancy analyzer 320 (e.g., when a significant discrepancy is observed—the significance can be determined based on an underlying application), the residual feature identifier 325 is invoked to identify residual features (e.g., from the input features) which are considered, e.g., to attribute to the significant discrepancy. Such identified residual features can then be sent to the unified representation construction unit 345 in order to be included in the unified representation. In general, such residual features correspond to the ones that are included in the input feature vector to the semantic extractor but not present in the reconstructed feature vector 335. Those residual features may reflect either the inability of the semantic extractor 315 to recognize the importance of the residual features or the impossibility of including residual features in the semantic-based representation due to, e.g., a restriction on the dimensionality of the semantic-based representation. Depending on the nature of the input data or the features (extracted by the feature extractor 315), the residual features may vary. Details related to residual features and identification thereof associated with document input data and textual based language models are discussed below.

In some embodiments, depending on the result of the discrepancy analyzer 320, the feature vector blurring unit 340 may be invoked to compute the blurred feature-based representation 240. In some embodiments, such a blurred feature vector may be considered as a feature vector that is a smoothed version of the input feature vector and the reconstructed feature vector 335. For example, if the reconstructed feature vector 335 does not include specific features that are present in the input feature vector, the smoothed or blurred feature vector may include such specific features but with different feature values or weights. In some embodiments, whether a blurred feature-based representation is to be generated may depend on the properties of the input data. In some situations, when the input data is in such a form it is nearly impossible to reliably extract the semantics from the data. In this case, the system 300 may be configured (not shown) to control to generate only a blurred feature-based representation. Although a blurred feature-based representation, as disclosed herein, is generated based on the semantic-based representation, the semantic-based representation in this case may be treated as an intermediate result and may not be used in the result unified representation for the input data.

Once the one or more component representations are computed, they are sent to the unified representation construction unit 345, which then constructs a unified representation for the input data 302 in accordance with FIG. 2(a).

Figure 3B:
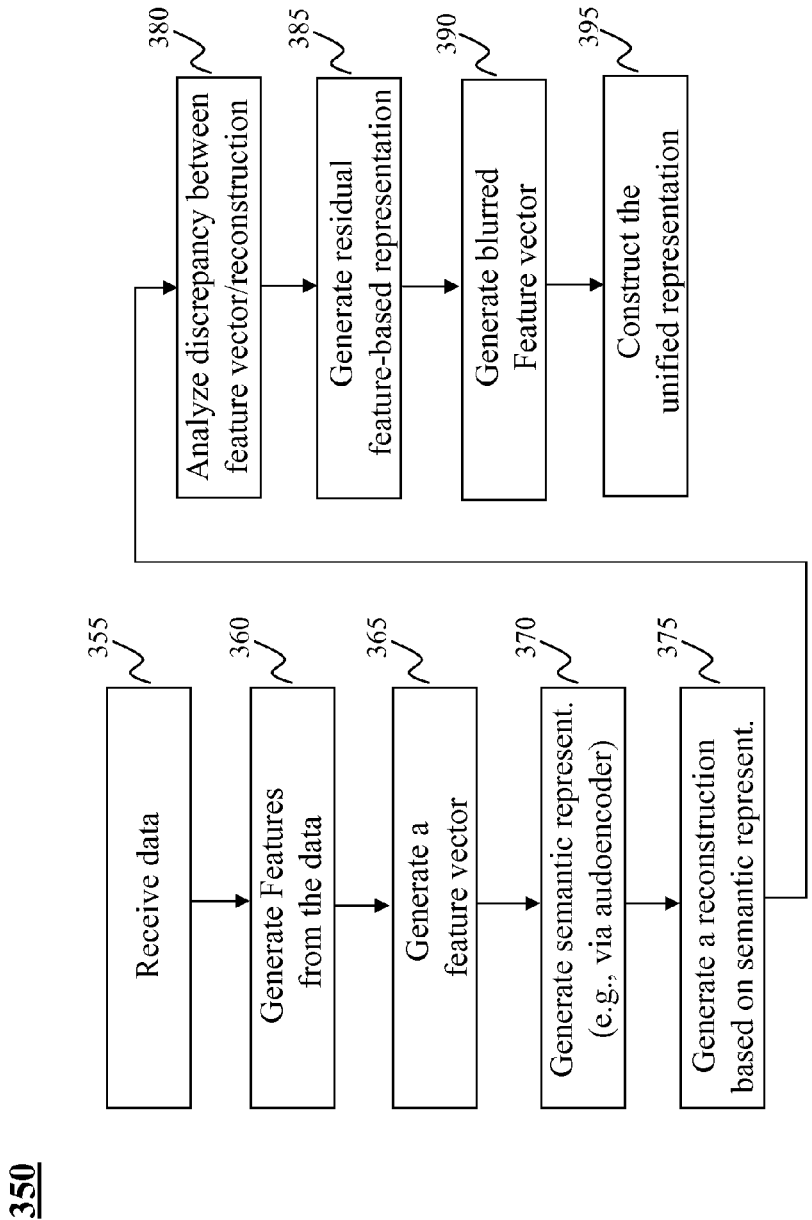
FIG. 3(b) is a flowchart of an exemplary process for generating a unified representation of data, according to an embodiment of the present teaching.

FIG. 3(b) is a flowchart of an exemplary process for generating a unified representation of data, according to an embodiment of the present teaching. Input data 302 is first received at 355 by the feature extractor 310. The input data is analyzed in accordance with one or more models stored in storage 305 (e.g., language model and/or information model) to generate, at 360, a plurality of features for the input data and form, at 365, a feature vector to be input to the semantic extractor 315. Upon receiving the input feature vector, the semantic extractor 315 generates, at 370, a semantic representation of the input data, which is then used to generate, at 375, the reconstructed feature vector. The reconstructed feature vector is analyzed, at 380, by the discrepancy analyzer 320 to assess the discrepancy between the input feature vector and the reconstructed feature vector. Based on the assessed discrepancy, residual features are identified and used to generate, at 385, the residual feature-based representation. In some embodiments, a blurred feature-based representation may also be computed, at 390, to be included in the unified representation of the input data. Finally, based on the one or more sub-representations computed thus far, the unified representation for the input data 302 is constructed, at 395.

Figure 4A:
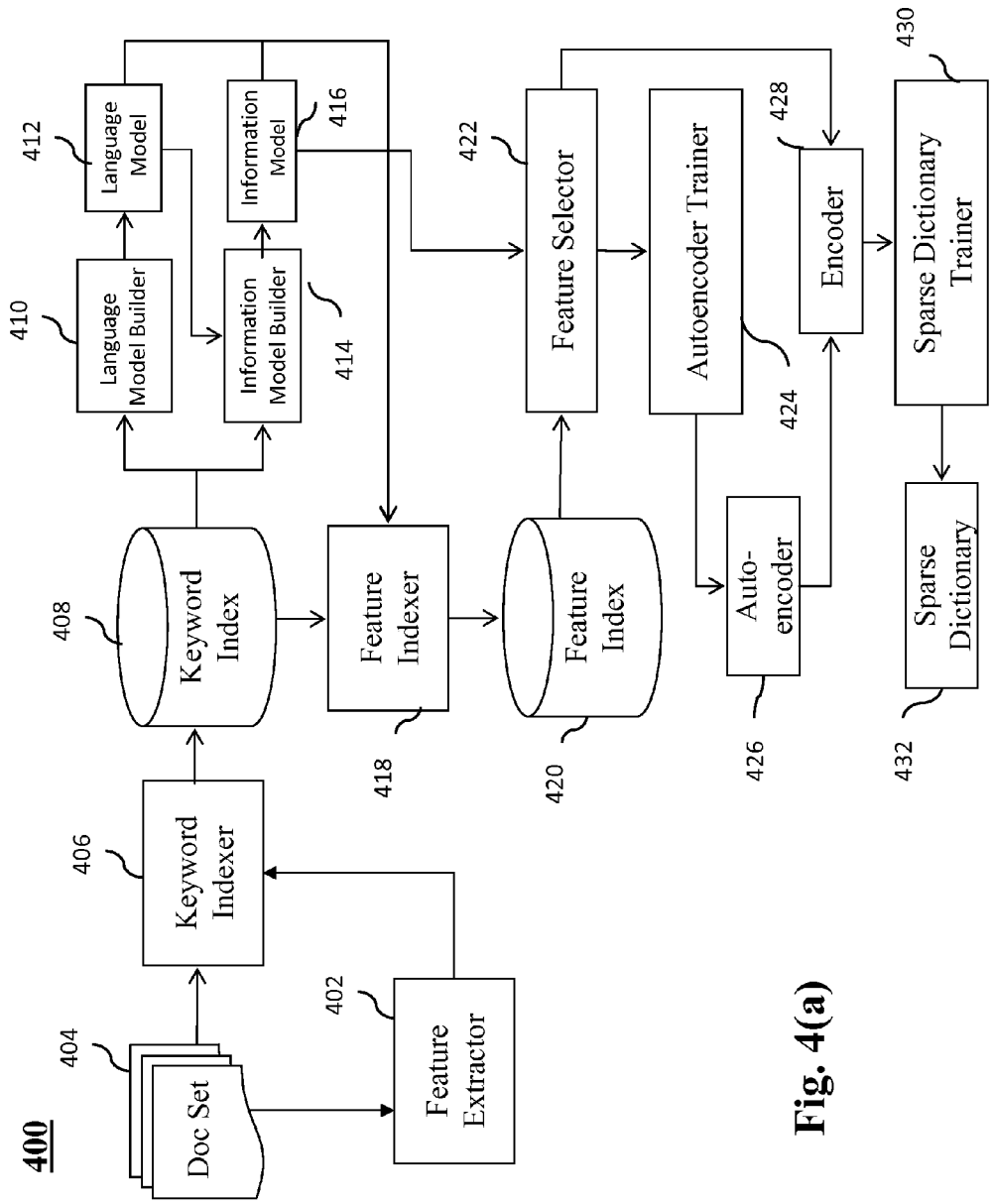
FIGS. 4(a) and 4(b) illustrate the use of a trained autoencoder for producing a unified representation for data, according to an embodiment of the present teaching.

FIG. 4(a) illustrates an exemplary configuration in which an autoencoder, to be used to implement the semantic extractor 315, is trained, according to an embodiment of the present teaching. An autoencoder in general is an artificial neural network (ANN) that includes a plurality of layers. In some embodiments, such an ANN includes an input layer and each neuron in the input layer may correspond to, e.g., a pixel in the image in image processing applications or a feature extracted from a text document in text processing applications. Such an ANN may also have one or more hidden layers, which may have a considerably smaller number of neurons and function to encode the input data to produce a compressed code. This ANN may also include an output layer, where each neuron in the output layer has the same meaning as that in the input layer. In some embodiments, such an ANN can be used to produce a compact code (or semantic code or semantic-based representation) for an input data and its corresponding reconstruction (or reconstructed feature vector). That is, an autoencoder can be employed to implement both the semantic extractor 315 and the reconstruction unit 330. To deploy an autoencoder, neurons in different layers need to be trained to reproduce their input. Each layer is trained based on the output of the previous layer and the entire network can be fine-tuned with back-propagation. Other types of autoencoders may also be used to implement the semantic extractor 315.

To implement the present teaching using an autoencoder, an input space for the autoencoder is identified from the input feature vectors computed from the input data. The input space may be a set of features limited in size such that it is computational feasible to construct an autoencoder. In the context of document processing, the input space is determined based on a residual IDF of each feature, and multiplying the residual IDF by the sum of the information associated with the feature in each of a plurality of input data sets. A residual IDF reflects the amount by which the log of the document frequency of a feature is smaller than expected given the term frequency (the total number of occurrences) of the feature. The expected log document frequency can be ascertained by linear regression against the term frequency given the set of features and their term and document frequencies. The input space can also be constructed by other means. In some embodiments, the input space is simply the N most common terms in the plurality of documents.

Once the input space is defined, a set of training vectors can be constructed by filtering the feature vectors of a plurality of documents through the input space. Such training vectors are then used to train an autoencoder as outlined above. Once an autoencoder is trained, it can be used in place of the semantic extractor 316 to generate a semantic-based representation (or a compact semantic code) for each piece of input data (e.g., a document).

In operation, as the feature space of a plurality of documents can be orders of magnitude larger than a realistic input space for an autoencoder, a first stage of dimensionality reduction may be applied to convert a large dimensionality sparse vector to generate a lossless, dense, and lower dimensionality vector.

The autoencoder training framework 400 as illustrated in FIG. 4(a), in accordance with some embodiments of the present teaching, creates statistical models that form the foundation of the unified representation framework and information retrieval system incorporating the same. As illustrated, the framework 400 includes a feature extractor 402 for identifying and retrieving features, e.g., terms, from an input document. The feature extractor 402 may perform linguistic analysis on the content of an input document, e.g., breaking sentences into smaller units such as words, phrases, etc. Frequently used words, such as grammatical words "the" and "a", may or may not be removed.

The training framework 400 further includes a Keyword Indexer 406 and a Keyword Index storage 408. The Keyword Indexer 406 accumulates the occurrences of each keyword in each of a plurality of documents containing the word and the number of documents containing the word, and stores the information in Keyword Index storage 408. The Keyword Index storage 408 can be implemented using an existing database management system (e.g., DBMS) or any commercially available software package for large-scale data record management.

The training framework 400 further includes a language model builder 410 and an information model builder 414. In the illustrated embodiment, the language model builder 410 takes the frequency information of each term in Keyword Index storage 408, and builds a Language Model 412. Once the Language Model 412 is built, the Information Model Builder 414 takes the Language Model 412 and builds an Information Model 416. Details regarding the language model and the information model are described in detail in the co-pending application. It is understood that any other language modeling scheme and/or information modeling scheme can be implemented in the Language Model Builder 410 and Information Model Builder 412.

The training framework 400 further includes a Feature Indexer 418 and a Feature Index storage 420. The Feature Indexer 418 takes the Language Model 412 and the Information Model 416 as inputs and builds an initial input feature vector for each of the plurality of documents. The initial input feature vector can be further refined to include only features that are considered to be representative of the content in an input document. In some embodiments, such related features may be identified using, e.g., the well known EM algorithm in accordance with the formulation as described in formulae (10) and (11) of the co-pending application. Such refined feature vector for each of the plurality of documents can then be stored in the Feature Index storage 420 for efficient search.

The training framework 400 may further include a Feature Selector 422, an Autoencoder Trainer 424, and an Autoencoder 426. The Feature Selector 422 may select an input feature space for the autoencoder 426. Once selected, each of the plurality of documents is transformed into a restricted feature vector representation, which is sent to the Autoencoder Trainer 424, which produces the Autoencoder 426. In this illustrated embodiment, the input space may be chosen by computing the residual IDF of each feature and multiplying the residual IDF by the sum of the information associated with the feature in each of the plurality of documents. In some embodiments, a first stage of dimensionality reduction may be added to the Feature Selector 422, which uses, e.g., top N selected features as base features and then adds additional mixed X features into the M features. For example, one can use N=2000 features all from the original feature space and feed the 2,000 features into the autoencoder, which will then reduce the input of dimensionality of 2,000 to create a semantic code of a lower dimensionality and reconstruct, based on the code, the original 2,000 features. Alternatively, one can use N=1,000 features from the original feature space plus X=1,000 features that are mapped from, e.g., 5,000 features. In this case, the input to the autoencoder still includes 2,000 features. However, those 2,000 features now represent a total of 6,000 (1,000+5,000) features in the original feature space. The autoencoder can still reduce the input 2000 features to a semantic code of lower dimensionality and reconstruct 2,000 reconstructed features based on the semantic code. But 1,000 of such reconstructed features will then be mapped back to the original 5,000 features. The N+X=M features are then fed into the Autoencoder Trainer 424 (only N is shown). The autoencoder 426 is trained to identify the original of the mixed X features in the document based on the base features. Optionally, other feature selection algorithms may also be implemented to reduce the input feature space.

The training framework 400 further includes an Encoder 428, a Sparse Dictionary Trainer 430, and a Sparse Dictionary 432. The purpose of training a sparse dictionary is to sparsify the dense codes produced by the autoencoder, which can then be used to speed up a search. The sparse dictionary 432 may be made optional if the dense search space is not an issue in specific search applications. The Encoder 428 takes the transformed feature vector of each of the plurality of documents from the Feature Selector 422 and passes the feature vector through the encoding part of the Autoencoder 426, which produces a compact semantic code (or semantic-based representation) for each of the plurality of documents. The Sparse Dictionary Trainer 430 takes the compact semantic code of each of the plurality of documents, and trains the Sparse Dictionary 432. In the illustrated embodiment, the Sparse Dictionary Trainer 430 may implement any classification schemes, e.g., the spherical k-means algorithm that generates a set of clusters and centroids in a code space. Such generated centroids for the clusters in the code space form the Sparse Dictionary 432. It is understood that other sparsification algorithms can also be employed to implement this part of the autoencoder training.

The Language Model 412, the Information Model 416, the Autoencoder 426, and the Sparse Dictionary 432, produced by the training framework 400 can then be used for indexing and search purposes. Once the autoencoder 426 is trained, it can be used to generate a compact semantic code for an input data set by passing the feature vector of the input through the encoding portion of the autoencoder. To generate a reconstructed feature vector, the compact semantic code can be forwarded to the decoding portion of the autoencoder, which produces the corresponding reconstructed feature vector based on the compact semantic code. This reconstruction can be thought of as a semantically smoothed variant of the input feature vector.

Another embodiment makes use of a hybrid approach, in which the top N informative features are not mixed, and the rest are mixed into a fixed X features. Classifiers may be trained to identify which of the mixed features is in the original document, using the un-mixed N features as input to the classifiers.

Figure 4B:
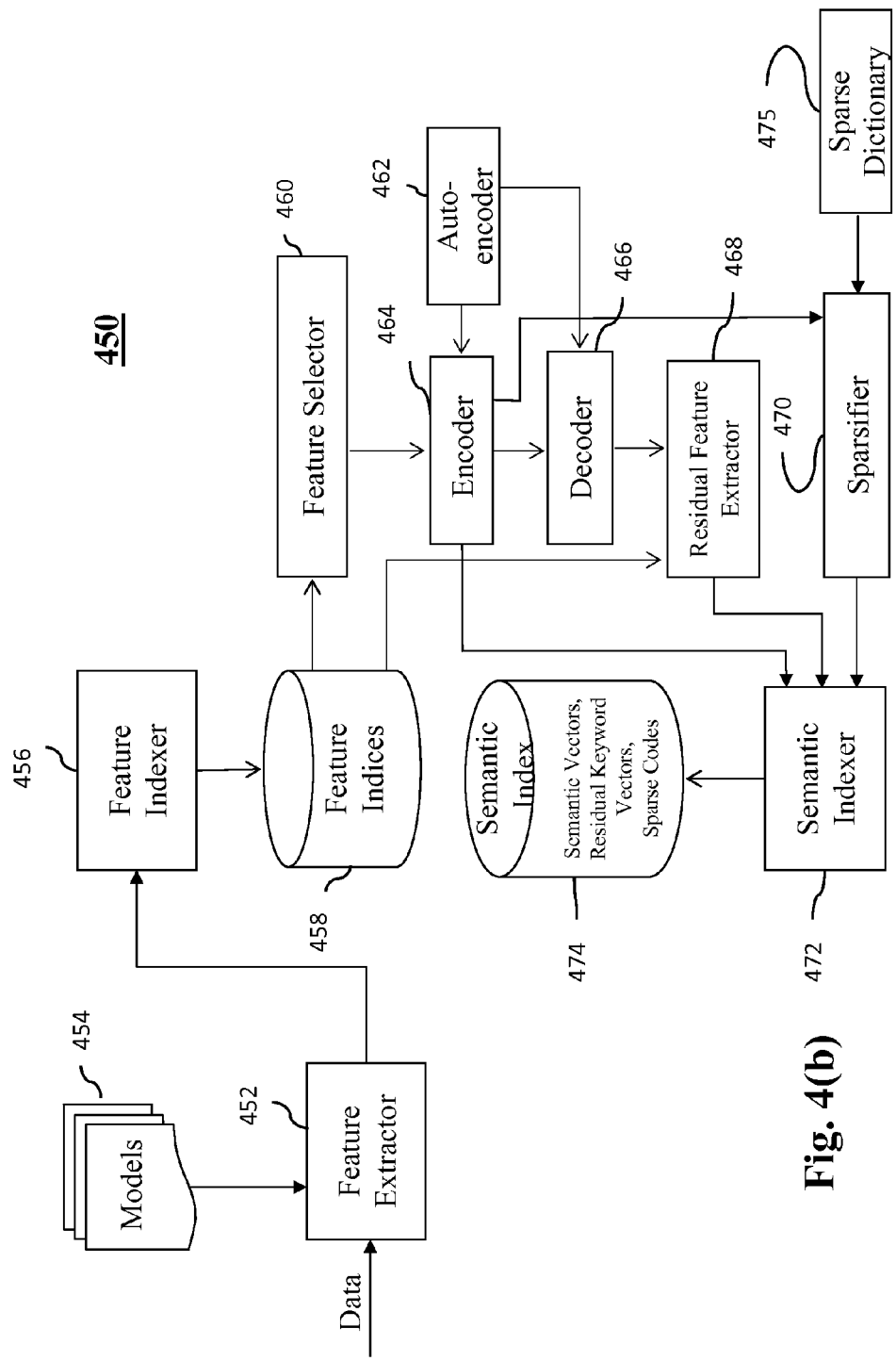

FIG. 4(b) illustrates the use of the trained autoencoder 426 in an indexing framework 450 that produces an index for an input data based on the unified representation, according to an embodiment of the present teaching. As shown in FIG. 4(b), the indexing framework illustrated includes a Feature Extractor 452 (similar to the one in the training framework) for identifying and retrieving features from input data, a Feature Indexer 456, which takes the Language Model 412 and optionally the Information Model 416 and produces a feature vector for each input data set based on the features extracted by the Feature Extractor 452 using, e.g., formulae (4), (10) and (11) as disclosed in the co-pending application. Such generated input feature vector for each input data set is then stored in the Feature Index Storage 458.

The indexing framework 450 further includes a Feature Selector 460 and an Encoder 464, similar to that in the training framework 400. The feature vector of each input data set stored in the Feature Index storage 458 is transformed by the Feature Selector 460 and passed to the Encoder 464 of the autoencoder 462. The Encoder 464 of the autoencoder 462 then generates a compact semantic code corresponding to the input feature vector. Such generated compact semantic code is then fed to a Decoder 466 of the autoencoder 462, which produces a reconstruction of the input feature vector of the Autoencoder 462 with respect to the input data set. If dimensionality reduction is employed, the mixed X features in such produced reconstruction can be further recovered to the original features in the input space of the Autoencoder 462.

The indexing framework 450 further includes a Residual Feature Extractor 468, which compares the reconstructed feature vector with the input feature vector and identifies residual features using, e.g., the EM algorithm as defined in formulae (22) and (23) of the co-pending application. The indexing framework 450 may also includes a Sparsifier 470, which takes a compact semantic code produced by the Encoder 464 and produces a set of sparse semantic codes based on a Sparse Dictionary 475 for each of the plurality of documents in the Feature Index storage 458. In the illustrated embodiment, a Euclidean distance between a compact semantic code and each of the centroids in the Sparse Dictionary 115 may be computed. One or more centroids nearest to the compact semantic code may then be selected as the sparse codes.

The indexing framework 450 further includes a Semantic Indexer 472 and Semantic Index storage 474. The Semantic Indexer 472 takes a compact semantic code, the corresponding residual feature vector, and one or more sparse codes produced for each of the plurality of documents in the Feature Index storage 458 and organizes the information and stores the organized information in the Semantic Index storage 474 for efficient search.

The exemplary indexing framework 450 as depicted in FIG. 4(*b*) may be implemented to process one document at a time, a batch of documents, or batches of documents to improve efficiency. Various components in the indexing framework 450 may be duplicated and/or distributed to utilize parallel processing to speed up the indexing process.

In some embodiments involving textual input data, the residual feature extractor 468 operates to select one or more residual keywords as features. In this case, given an input feature vector for a document as well as a compact semantic code produced by the autoencoder, a residual keyword vector may be formed as follows. First, the reconstruction based on the semantic code is computed by the decoding portion of the autoencoder. The residual keyword vector is so constructed that the input feature vector for a document can be modeled as a linear combination of the reconstruction feature vector and the residual keyword vector. Specifically, in some embodiments, the residual keyword vector can then be computed using, e.g., the EM algorithm as follows:

$$E\text{-step: } e_w = p(w|D) \cdot \frac{\hat{p}(w|D)}{(1-\lambda)p(w|D) + \lambda\hat{p}(w|D)} \quad (1)$$

$$M\text{-step: } \hat{p}(w|D) = \frac{e_w}{\sum_\tau e_\tau} \cdot \text{i.e., normalize the model} \quad (2)$$

Here $\hat{p}(w|D)$ is the residual keyword vector, $p(w|D)$ is the input feature vector, and $p(w|R)$ is the reconstructed feature vector. The symbol $\lambda$ in equation (1) is an interpolation parameter and can be set empirically.

As discussed above, the unified representation 210 may also include a blurred feature-based representation 240. In some embodiments, such a blurred feature-based representation may be computed by taking a linear interpolation of the input feature vector and the reconstructed feature vector. The interpolation may involve certain computational parameters such as the weights applied to the input feature vector and the reconstructed feature vector. Such parameters may be used to control the degree of blurring and may be determined empirically based on application needs. In practice, when the unified representation of input data is used to build an appropriate index for the stored input data, the blurred feature-based representation may always be utilized in building such an index. This strategy may be adopted to ensure that the index can be effectively utilized for any query, including a query in such a form that extracting a semantic-based representation and, hence, also the residual feature-based representation is not possible. For example, in this case, a feature-based representation may be generated for the query which can be effectively used to retrieve archived data based on indices built based on the blurred feature-based representations of the stored data.

Figure 5A:
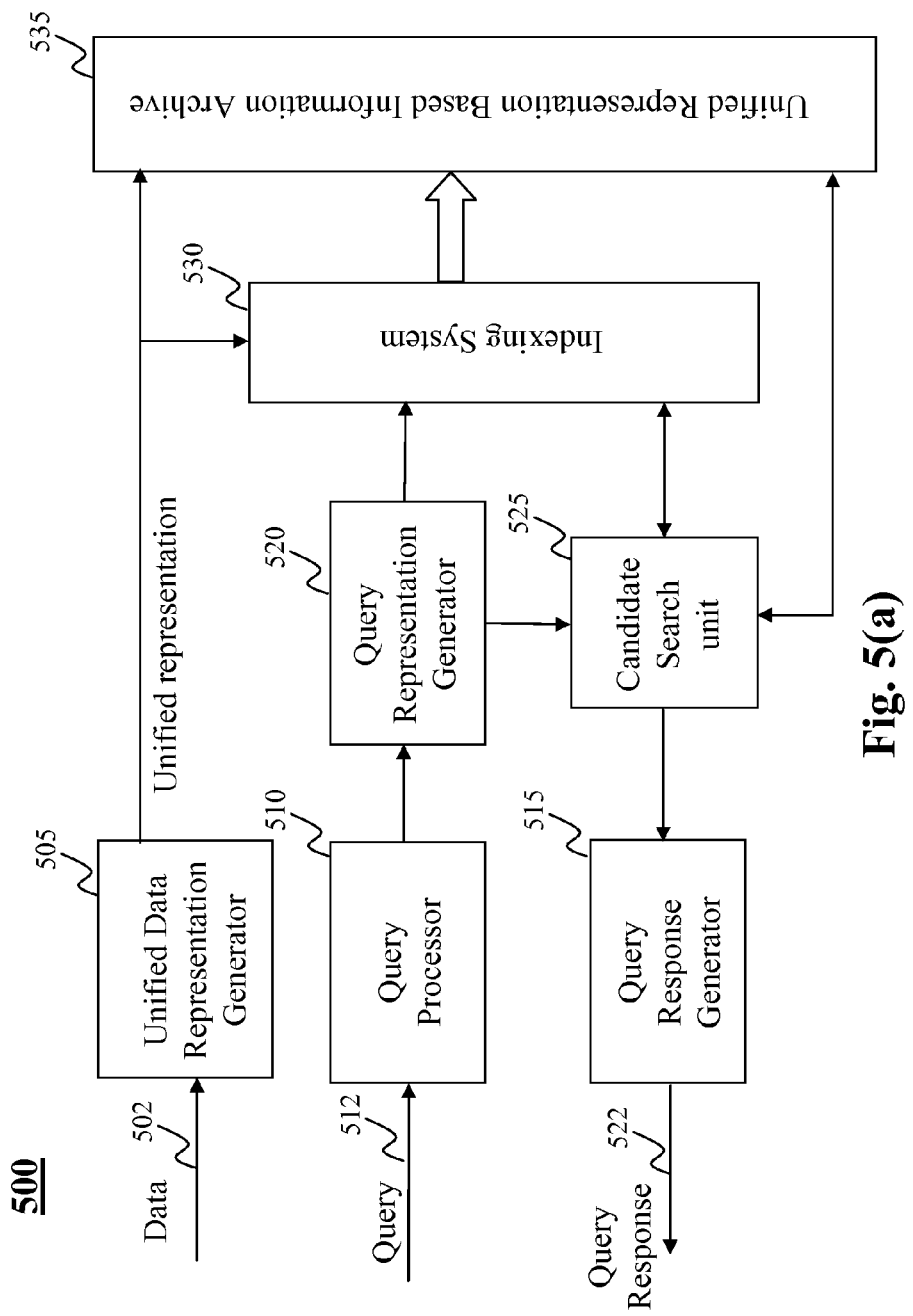
FIG. 5(a) depicts a high level diagram of an exemplary system for search and retrieval based on unified representations of information, according to an embodiment of the present teaching.
Figure 5B:
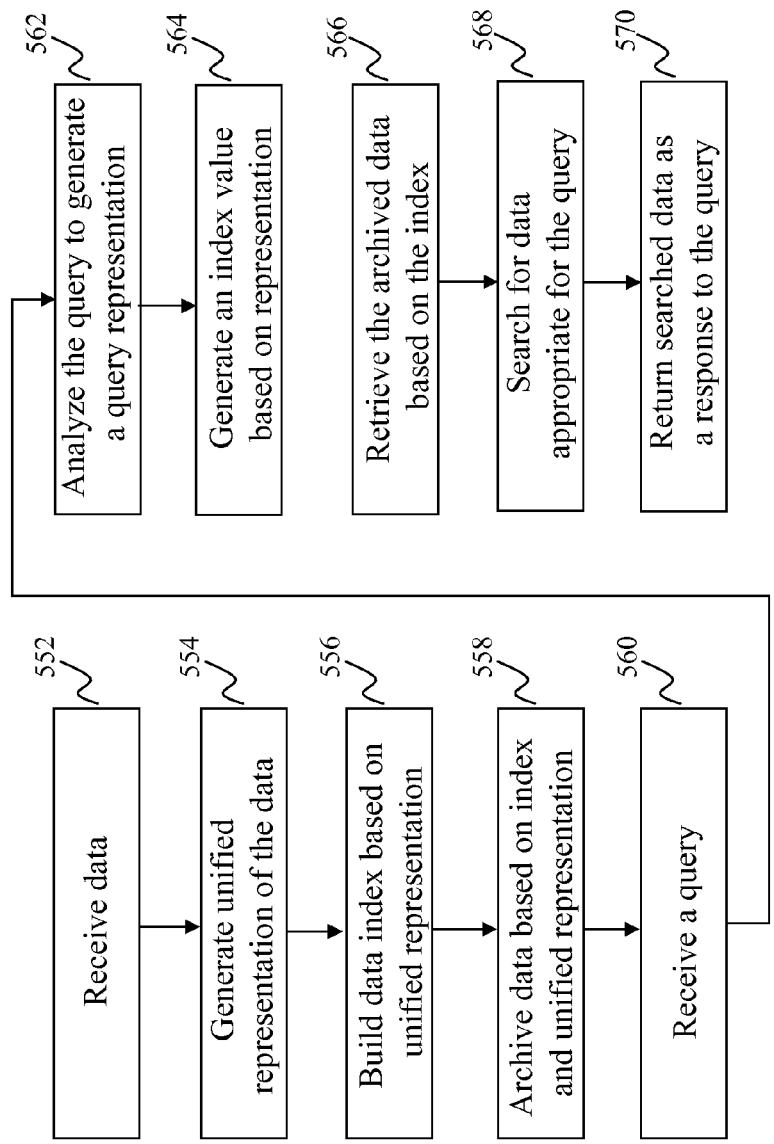
FIG. 5(b) is a flowchart of an exemplary process for search and retrieval based on unified representation of information, according to an embodiment of the present teaching.

FIG. 5(*a*) depicts a high level diagram of an exemplary search/query system 500 for search and retrieval based on unified representations of information, according to an embodiment of the present teaching. The exemplary search/query system 500 includes a unified data representation generator 505 that generates a unified representation for input data 502, an indexing system 530 that builds an index for the input data 502 based on the unified representation of the input data, a unified representation based information archive 535 that stores the input data based on its unified representation, a query processor 510 that processes a received query 512 to extract features relevant, a query representation generator 520 that, based on the processed query from the query processor 510, generates a representation of the query and sends the representation to a candidate search unit 525, that searches the archive 535 to identify stored data that is relevant to the query based on, e.g., a similarity between the query representation and the unified representations of the identified archived data. Finally, the exemplary search/query system 500 includes a query response generator 515 that selects appropriate information retrieved by the candidate search unit 525, forms a query response 522, and responds to the query.

FIG. 5(*b*) is a flowchart of an exemplary process for the search/query system 500, according to an embodiment of the present teaching. Input data is first received at 552. Based on the input data and relevant models (e.g., language model and/or information model), a unified representation for the input data is generated at 554 and index to be used for efficient data retrieval is built, at 556, based on such generated unified representation. The input data is then archived, at 558, based on its unified representation and the index associated therewith. When a query is received at 560, it is analyzed at 562 so that a representation for the query can be generated. As discussed herein, in some situations, a unified representation for a query may include only the feature-based representation. The decision as to the form of the unified representation of a query may be made at the time of processing the query depending on whether it is feasible to derive the semantic-based and reconstructed feature-based representations for the query.

Once the unified representation for the query is generated, an index is built, at 564, based on the query representation. Such built index is then used to retrieve, at 566, archived data that has similar index values. Appropriate information that is considered to be responsive to the query is then selected at 568 and used, at 570, as a response to the query.

Figure 6A:
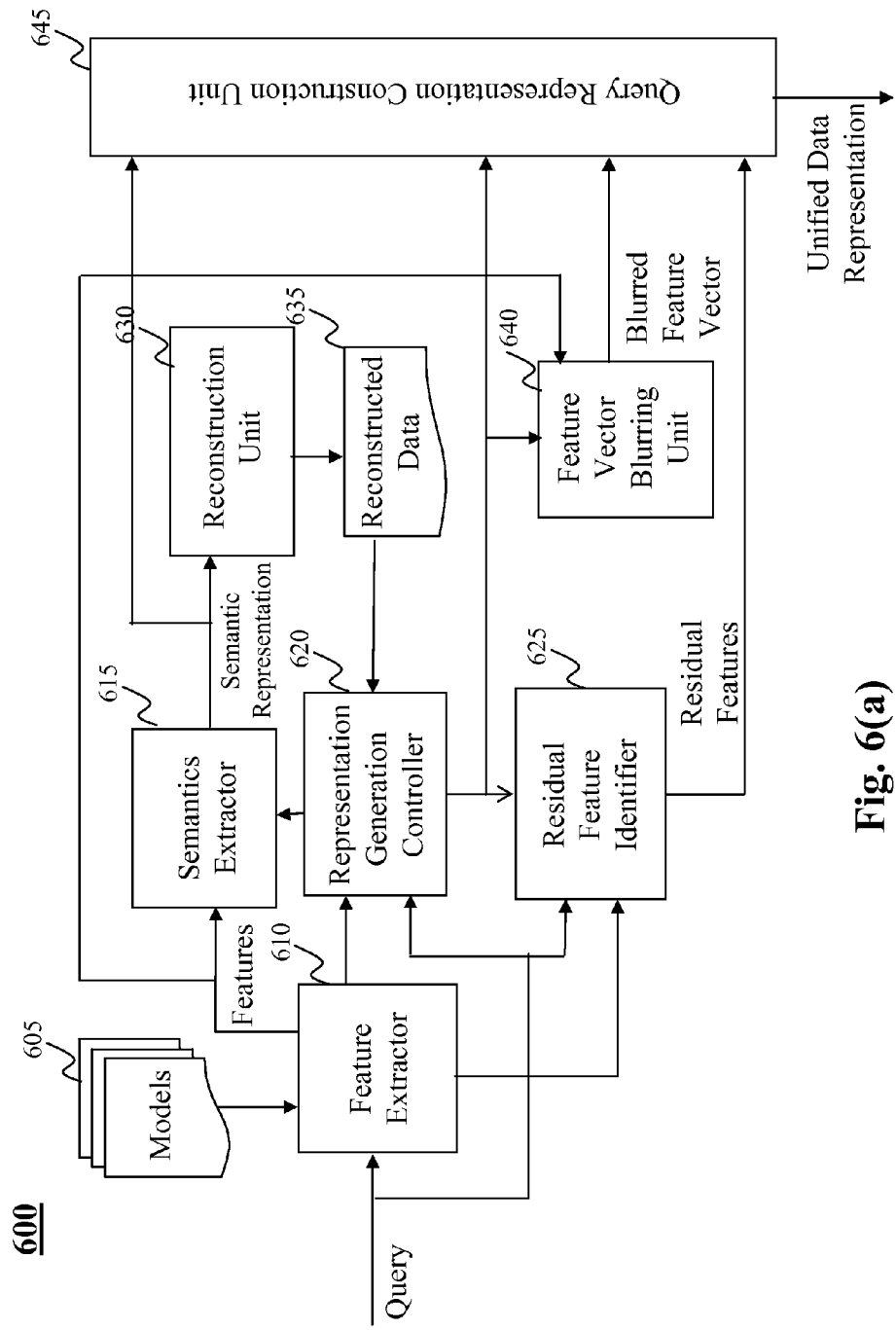
FIG. 6(a) depicts a high level diagram of an exemplary system for generating a unified representation of a query, according to an embodiment of the present teaching.

FIG. 6(*a*) depicts a high level diagram of an exemplary query representation generator 520, according to an embodiment of the present teaching. This exemplary query representation generator 520 is similar to the exemplary unified representation generator 300 for an input data set (see FIG. 3(*a*)). The difference includes that the query representation generator 520 includes a representation generation controller 620, which determines, e.g., on-the-fly, in what form the query is to be represented. As discussed above, in some situations, due to the form and nature of the query, it may not be possible to derive reliable semantic-based and reconstructed feature-based representations. In this case, the representation generation controller 620 adaptively invokes different functional modules (e.g., a semantics extractor 615, a residual feature identifier 625, and a feature blurring unit 640) to form a unified representation that is appropriate for the query. After the adaptively determined sub-representations are generated, they are forwarded to a query representation construction unit 645 to be assembled into a unified representation for the query.

Figure 6B:
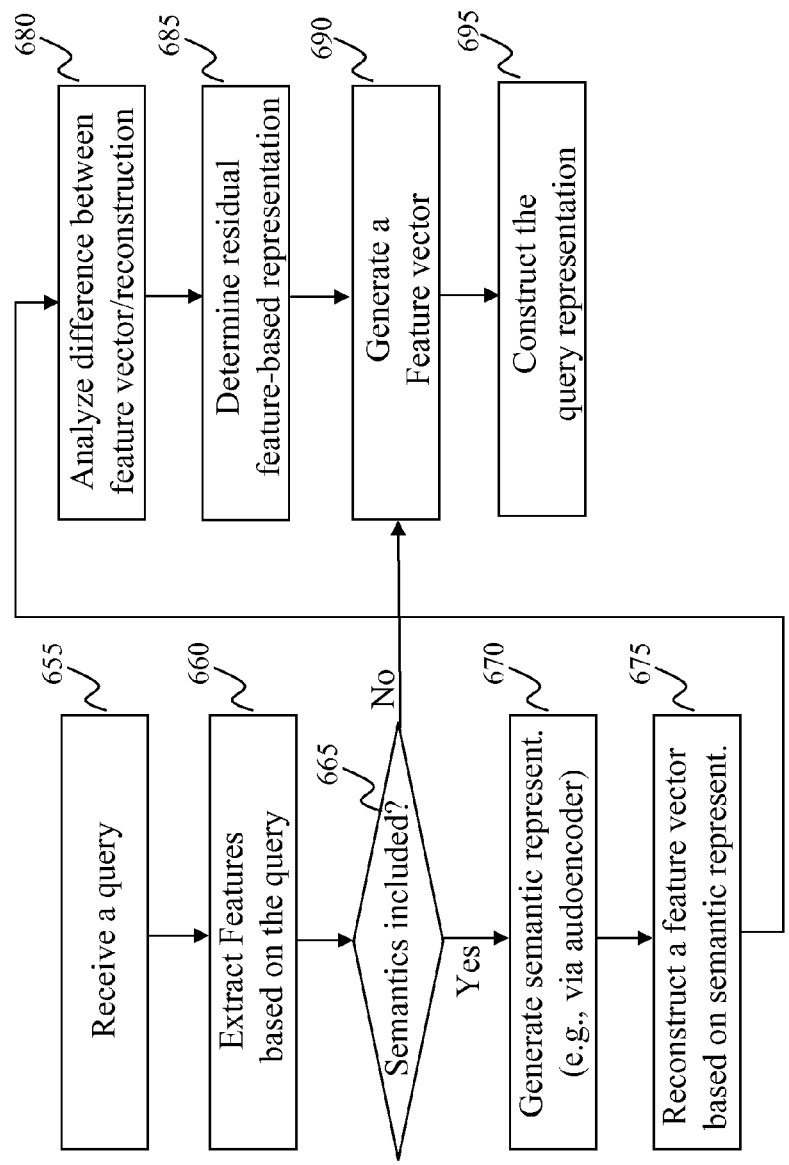
FIG. 6(b) is a flowchart of an exemplary process for generating a unified representation of a query, according to an embodiment of the present teaching.

FIG. 6(b) is a flowchart of an exemplary process of the query representation generator 520, according to an embodiment of the present teaching. When a query is received at 655, features are extracted from the query at 660. Based on the extracted features, it is determined whether the semantic-based representation, and hence also the residual feature-based representation, are appropriate for the query. If the semantic based and residual feature based representations are appropriate for the query, they are generated at steps 670-685 and a blurred feature-based representation can also be generated at 690. If it is not appropriate to generate semantic-based and residual feature-based representations for the query, the query representation generator 520 generates directly a feature vector based representation at 690. For example, such a feature vector can be the feature vector generated based on the features extracted at step 660, which may correspond to an extreme case where the blurring parameter is, e.g., 0 for the reconstructed feature-based vector. With this feature vector, an index can be constructed for search purposes and the search be performed against the indices of the stored data built based on their blurred feature-based representations. In this way, even with queries for which it is difficult to generate semantic-based and residual feature-based representations, retrieval can still be performed in a more efficient manner.

In identifying archived data considered to be, e.g., relevant to a query, based on unified representations, the similarity between a query and an archived document may be determined by calculating, e.g., the distance between the unified representation of the query and the unified representation of the document. For instance, a similarity may be computed by summing the cosine similarity with respect to the respective residual feature-based representations and the cosine similarity with respect to the respective semantic-based representations.

In some embodiments, the similarity between a query and a document may be determined by summing the following:

$$\exp\left(-\sum_w q(w)\log\frac{q(w)}{d(w)}\right)$$

where q(w) is the value for a residual feature w in the query and d(w) is the value of a residual feature w in the document, and the cosine similarity between the respective semantic codes.

Figure 7:
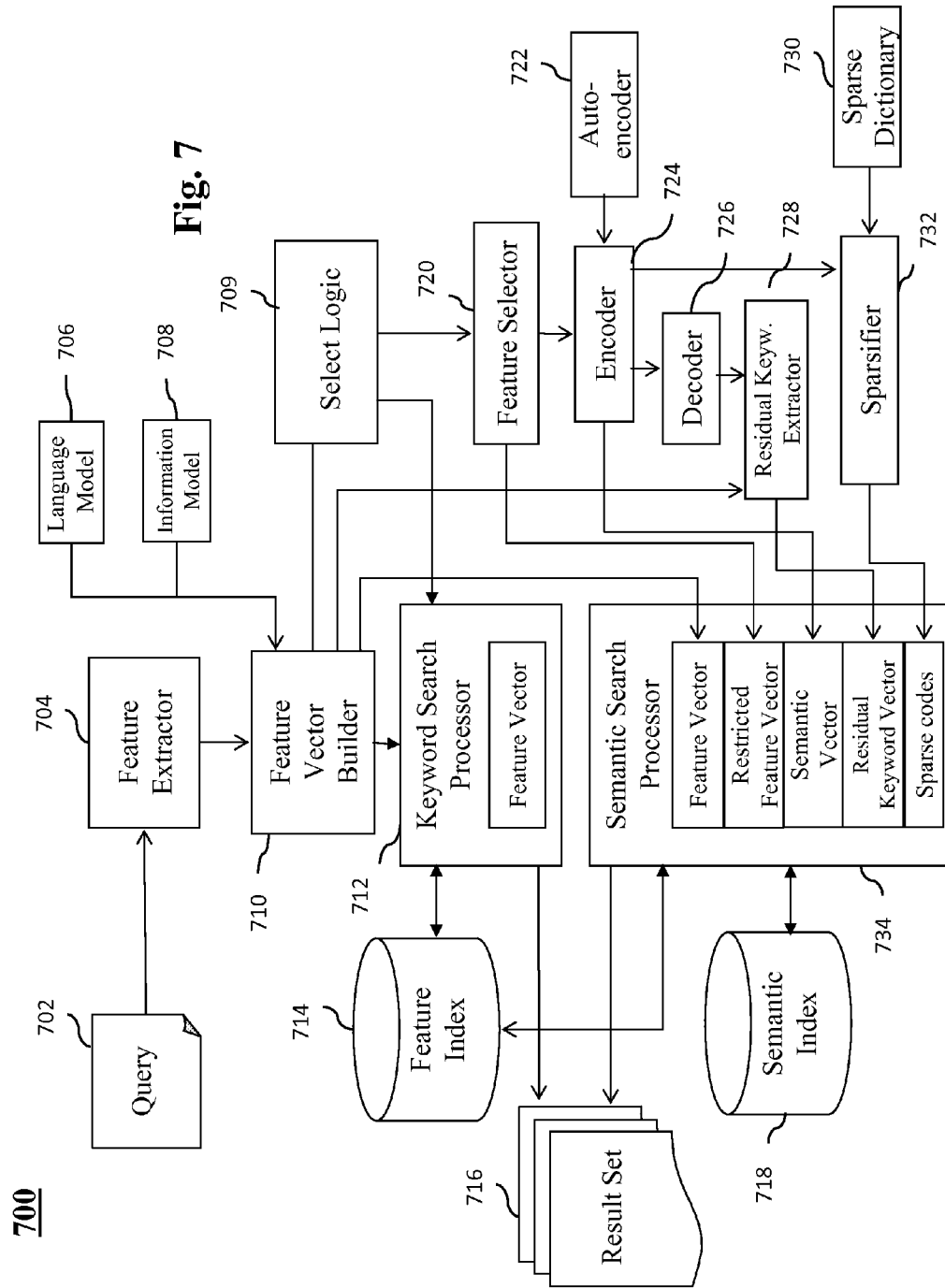
FIG. 7 depicts a high level diagram of an exemplary unified representation based search system utilizing an autoencoder, according to an embodiment of the present teaching.

FIG. 7 depicts a high level diagram of an exemplary unified representation based information search/retrieval system 700 utilizing an autoencoder, according to an embodiment of the present teaching. As shown in FIG. 7, the information search/retrieval system 700 includes a Feature Extractor 704 for identifying features from a received query 702. The information search/retrieval system 700 also includes a Feature Vector Builder 710, which is used to build a feature vector for the query based on the features extracted. In addition, the information search/retrieval system 700 also includes a Language Model 706, and an Information Model 708, established, e.g., according to equations (4), (10) and (11) described in the co-pending application.

In the illustrated embodiment, the information search/retrieval system 700 further includes a selection logic 709 that controls whether a Keyword based Search or a Semantic based Search is appropriate based on, e.g., the extracted features from the query (e.g., number of features extracted). If the number of features extracted from the query is lower than a predefined threshold, a Keyword Search may be elected for handling the query. Otherwise, Semantic based Search may be performed. It is understood that any other criteria may be employed to make a determination as to how the query is to be handled.

In Keyword search, the input feature vector formed based on the query is sent to a Keyword Search Processor 712, which computes, e.g., a KL divergence between the input feature vector of the query and the feature vector of each of the plurality of documents in the Feature Index storage 714 and identifies one or more documents that associate with the least KL divergence. Such identified documents may then be sent back to a user who issues the query 702 as a response to the query. In some embodiments, the retrieved documents may be arranged in a ranked order based on, e.g., the value of the KL divergence.

In Semantic Search, the input feature vector of the query is sent to a Feature Selector 720 that transforms the input feature vector into a restricted feature vector, which is then sent to an Encoder 724, which corresponds to the encoding part of the Autoencoder 722, to generate a compact semantic code for the query. The compact semantic code is then sent to a Decoder 726 (corresponding to the decoder part of the autoencoder 722) and a Sparsifier 732, so that a reconstructed feature vector and a set of sparse codes can be produced by the Decoder 716 and the Sparsifier 732, respectively.

In the illustrated embodiment, a Residual Keyword Extractor 728 is used to compare the reconstructed feature vector with the input feature vector of the query to create a residual keyword vector based on, e.g., the EM algorithm, as described in equations (22) and (23) of the co-pending application. The input feature vector, the restricted feature vector, the compact semantic code, the residual keyword vector, and the sparse codes of the query are then sent to a Semantic Search Processor 734. The Semantic Search Processor 734 then compares the restricted feature vector, which represents the information used in the semantic code, with the input feature vector. If the information included in the semantic code exceeds a preset percentage threshold, the sparse codes may be used to filter the documents in the index to reduce the search space. Otherwise, the residual keywords may be used to filter the documents.

Once the documents are filtered (either by the sparse codes or by the residual words), a cosine similarity can be computed between the semantic code of the query and semantic code of each of the plurality of documents. A KL divergence may then be calculated between the residual keyword vector of the query and the residual keyword vector of each of the plurality of documents. The final similarity score used for ranking the matched documents can be a weighted sum of the cosine similarity and KL divergence distance measures. This weight can be determined based on the percentage of information used in the semantic code. In some embodiments, a user may have the option, at the time of making a query, to dynamically determine the weight of either the semantic code vector or the residual keyword vector and such dynamically specified weight can be used to determine the amount of semantic information to be used in the similarity calculation. In still another embodiment, the amount of information in the feature vector which is represented by features in the input space of the autoencoder is used to set the weight put on the semantic code vector relative to the weight put on the residual keyword vector, within the unified information representation of the query. As can be appreciated by a person skilled in the art, the above illustrated similarity measurements are merely for discussion and are not meant to limit the scope of the present teaching.

In most situations, semantic codes produced by the autoencoder 722 are dense vectors with most of the vector entries being non-zero. To reduce the search space, clustering or sparsification algorithms can be applied to the semantic codes to, e.g., group similar codes together. Clustering may be viewed as a special case of sparsification, in which there is only one nonzero element of the vector. In some embodiments, a traditional k-means clustering algorithm may be applied to the semantic codes, which generates a set of clusters and corresponding centroids in the code space that correspond to the sparse dictionary. Documents are assigned to the nearest cluster or clusters based on some similarity measure between the code of the document and each cluster centroid. Clusters assigned to each document may be treated as sparse dimensions so that they can be indexed, searched, and/or used as filters. When sparse dimensions are used as filters, search on a code may be restricted to one or more sparse dimensions that the code belongs to.

In some embodiments, spherical k-means can be used to generate a set of clusters and centroids in the code space. In other embodiments, a hierarchical agglomerative clustering approach may be used to generate a set of clusters and centroids in the code space. In some embodiments, sparse representations can also be added to each layer of the autoencoder directly. The dense (compact) representations can be maintained for faster computation of document-to-document match scores.

With the employment of an autoencoder and other models such as a language model and/or an information model which were established based on training data, one issue is that over time, due to the continuous incoming data, the trained autoencoder or models may gradually become degraded, especially when the original data used in training the models become more and more different from the presently incoming data. In this case, the autoencoder and/or models built with the original training data may no longer be suitable to be used for processing the new data. In some embodiments of the present teaching, a monitoring process may be put in place (not shown) to detect any degradation and determine when re-training of the models and/or re-indexing becomes needed. In this monitoring process, measurement of the perplexity of the models as well as the deviations between the reconstructed feature vector and the input feature vector may be made and used to make the determination.

When a new model (e.g., the language model) is created, all documents archived and indexed in the system are processed based on the new model and then archived with their corresponding index determined under the scheme of the new model. Then the mean and variance of the perplexity of the corpus language model, and of the Kullback-Leibler divergence between the input feature vector for a document and the reconstructed feature vector (e.g., by the autoencoder) are also computed with respect to all documents presently archived in the system. As new documents enter the system, an exponential moving average on such statistics may be maintained, initialized to the above-mentioned mean. When it is no longer possible to maintain the exponential moving average above a threshold (e.g., a tolerance level) with respect to the baseline mean, a retraining cycle may be triggered.

When a retraining cycle is triggered, the system moves from the monitoring state to a re-training state and begins training a language model using the information from, e.g., the live feature index. The resulting language model may then be used, together with the live feature index, to create a new corpus information distribution. Such resulting information distribution and the language model can then be used to produce an updated feature index. Based on this updated feature index, an updated input space for an autoencoder can be determined. Given this updated input space and the updated feature index, training data for the autoencoder can be produced and applied to train an autoencoder. The re-trained autoencoder is used together with the updated feature index to create a set of sparsifier training data, based on which an updated sparsifier is established accordingly. An updated semantic index is then built using the updated autoencoder and the sparsifier, based on data from the updated feature index as input.

Once the semantic index is updated and all documents from the live index have been indexed with respect to the updated index, the system substitutes the update feature index and semantic index with the live indexes and destroys the old live indexes. This completes the re-training cycle. At this point, the system goes back to the monitoring state. If new incoming input data is received during re-training and updating, the new input data may be continuously processed but based on both the live models and the updated models.

Figure 8:
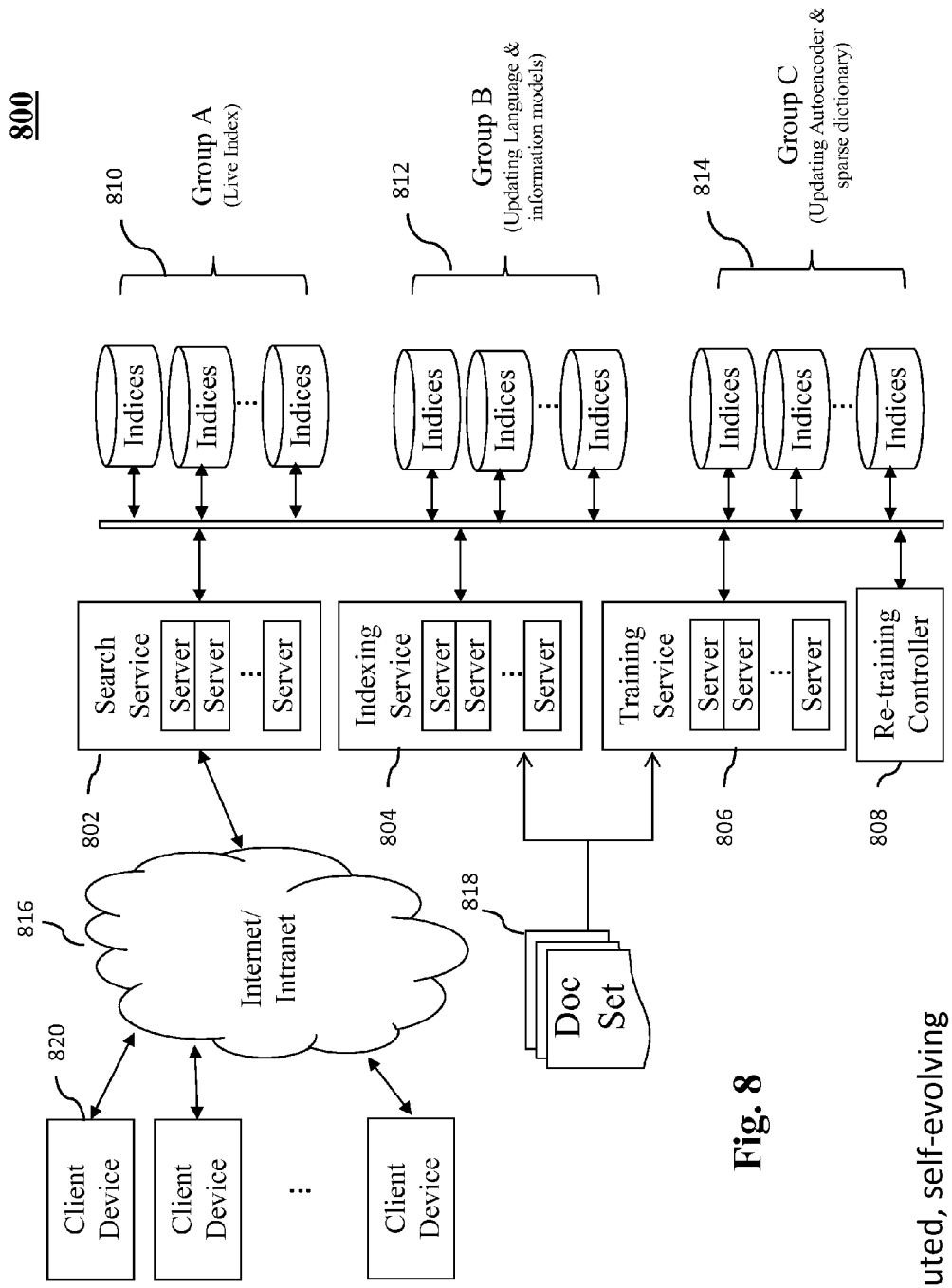
FIG. 8 depicts a high level diagram of an exemplary unified representation based search system capable of adaptive and dynamic self-evolving, according to an embodiment of the present teaching.

FIG. 8 depicts a high level diagram of an exemplary unified representation based search system 800 capable of adaptive self-evolution, according to an embodiment of the present teaching. In this illustrated self-evolving information retrieval system 800, the system includes a Search Service 802 subsystem that provides search service to a plurality of client devices 820 via network connections 816 (e.g., the Internet and/or Intranet). The client devices can be any device which has a means for issuing a query, receiving a query result, and processing the query result. The Search Service 802 functions to receive a query from a client device, search relevant information via various accessible indices from an archive (not shown), generate a query response, and send the query response back to the client device that issues the query. The Search Service 802 may be implemented using one or more computers (that may be distributed) and connecting to a plurality of accessible indices, including indices to features or semantic codes via network connections. One exemplary implementation of the Search Service 802 is shown in FIG. 7.

The exemplary system 800 also includes an Indexing Service 804 subsystem, which includes a plurality of servers (may be distributed) connected to a plurality of indexing storages. The Indexing Service 804 is for building various types of indices based on information, features, semantics, or sparse codes. In operation, the Indexing Service 804 functions to take a plurality of documents, identify features, generate semantic codes and sparse codes for each document and build indices based on them. The indices established may be stored in a distributed fashion via network connections. Such indices include indices for features including blurred features, indices for semantic codes, or indices for sparse codes. An exemplary implementation of the Indexing Service 804 is provided in FIG. 4(b).

The exemplary self-evolving system 800 further includes a Training Service 806 subsystem, which may be implemented using one more computers. The Training Service subsystem 806 may be connected, via network connections, to storages (may also be distributed) having a plurality of indices archived therein, e.g., for features such as keywords or for semantics such as semantic codes or sparse codes. The Training Service 806 may be used to train a language model, an information model, an autoencoder, and/or a sparse dictionary based on a plurality of documents. The training is performed to facilitate effective keyword and semantic search. An exemplary implementation of the Training Service subsystem 806 is provided in FIG. 4(a).

The exemplary system 800 also includes a Re-training Controller 808, which monitors the state of the distributed information retrieval system, controls when the re-training needs to be done, and carries out the re-training. In operation, when the system 800 completes the initial training, the system enters into a service state, in which the Search Service 802 handles a query from a client device and retrieves a plurality of relevant documents from storages based on live indices 810 (or Group A). The Re-training Controller 808 may then measure the mean and variance of the perplexity of the corpus language model and/or the KL divergence between the input feature vector and the reconstructed feature vector (by, e.g., the autoencoder) for each and every document indexed in the system.

As new documents are received by the system, the exponential moving averages for these statistics are computed. When an exponential moving average for one of such statistics is above a predefined tolerance level, the Re-training Controller 808 may determine that it is time for re-training and invoke relevant subsystems to achieve that. For example, the Training Service 806 may be invoked first to re-train the corpus language model and the information model and accordingly build the feature indices (Group B) 812 with updated language model and information model. The Training Service 806 may then re-train the autoencoder and the sparse dictionary and accordingly build the semantic indices (Group C) 814 based on the updated semantic model and sparse dictionary. At the end of the re-training state, the Re-training Controller 808 replaces the live indices (Group A) 810 with the updated feature indices (Group B) 812 and semantic indices (Group C) 814. When the re-training is completed, the system 800 enables the system to go back to the monitoring state.

In some situations, when the mean and variance of the perplexity of the corpus language model remain within the pre-defined tolerance level, the autoencoder reconstruction error may be above another pre-defined tolerance level. In this case, the Re-training Controller 808 may initiate a partial training service. In this partial re-training state, the Training Service 806 may re-train only the autoencoder and the sparse dictionary and accordingly build the semantic indices (Group C) 814 using the updated semantic model and the sparse dictionary. In this partial state, the Re-training Controller 808 replaces only the semantic indices in Group A (810) using the updated semantic indices (Group C) 814.

The unified representation disclosed herein may be applied in various applications. Some example applications include classification and clustering, tagging, and semantic-based bookmarking. In applying the unified information representation in the classification and clustering applications, the component sub-representations (the semantic-based representation, the residual feature-based representation, and the blurred feature-based representation) of the unified information representation can be used as features fed into a classification or a clustering algorithm. In some embodiments, when applied to classification, the autoencoder may be expanded to include another layer (in addition to the typical three layers) when the labels for different classes are made available. In this case, the number of inputs of the additional layer is equal to the dimensionality of the code layer and the number of outputs of the added layer equals to the number of underlying categories. The input weights of the added layer may be initialized with small random values and then trained with, e.g., gradient descent or conjugate gradient for a few epochs while keeping the rest of the weights in the neural network fixed. Once this added "classification layer" is trained for a few epochs, the entire network is then trained using, e.g., back propagation. Such a trained ANN can then be used for classification of incoming data into different classes.

In some embodiments, another possible application of the unified representation as disclosed herein is tagging. In an embodiment for a tagging application, labels can be generated for each sparse dimension and used as, e.g., concept tags because in general sparse dimensions associated with a document represent the main topics of the document. A pseudo-document in the input feature space may be constructed by decompressing a semantic code including only one active dimension—that is, one dimension in the sparse vector will have a weight of 1, and the rest will be zero. In this way, features can be identified that are represented by that dimension of the sparse code vector. Then, the KL divergence between this pseudo-document and the corpus model may be computed, and the N features with the greatest contribution to the KL divergence, that is, the largest weighted log-likelihood ratio, can be used as a concept label for that dimension.

In some embodiments, the unified information representation may also be applied in semantic-based bookmarking. Traditional bookmarking used by a web browser uses the URL representing a web location as the unique identifier so that the web browser can subsequently retrieve content from that location. A semantic-based bookmarking approach characterizes content from an information source based on semantic representations of the content. To subsequently identify content with similar semantics, the semantic-based bookmarking approach stores the semantic representation so that other semantically similar content can be found later based on this semantic representation. The unified information representation disclosed herein can be used to provide a complete information representation, including the complementary semantic, residual feature, and/or smoothed feature based characterization of the underlying content. This approach allows a system to adapt, over time, to the changes in the content from an information source.

Semantic-based bookmarking using unified information representation allows retrieval of documents of either exactly the same content and/or documents that have similar semantic content. The similarity may be measured based on, e.g., some distance measured between the unified information representation of an original content (based on which the unified representation is derived) and each target document. A unified information representation may also be used to characterize categories. This enables a search and/or retrieval for documents that fall within a pre-defined specific category, represented by its corresponding unified representation.

Semantic-based bookmarking using unified information representation may also be used for content monitoring, topic tracking, and alerts with respect to given topics of interest, and personal profiling, etc. Semantic bookmarks established in accordance with unified representation of information can be made adaptive to new content, representing new interests, via, e.g., the same mechanism as described herein about self-evolving. For example, the adaptation may be realized by generating a unified representation of the new documents of interest. Alternatively, the adaptation may be achieved by combining the textual information representing an existing semantic bookmark and new documents to generate an updated unified information representation for the semantic bookmark.

It is understood that, although various exemplary embodiments have been described herein, they are by ways of example rather than limitation. Any other appropriate and reasonable means or approaches that can be employed to perform different aspects as disclosed herein, they will be all within the scope of the present teaching.

To implement the present teaching, computer hardware platforms may be used as the hardware platform(s) for one or more of the elements described herein (e.g., the model based feature extractor 310, the semantic extractor 315, the reconstruction unit 330, the discrepancy analyzer 320, and residual feature identifier 325, and feature vector blurring unit 340). The hardware elements, operating systems and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 9:
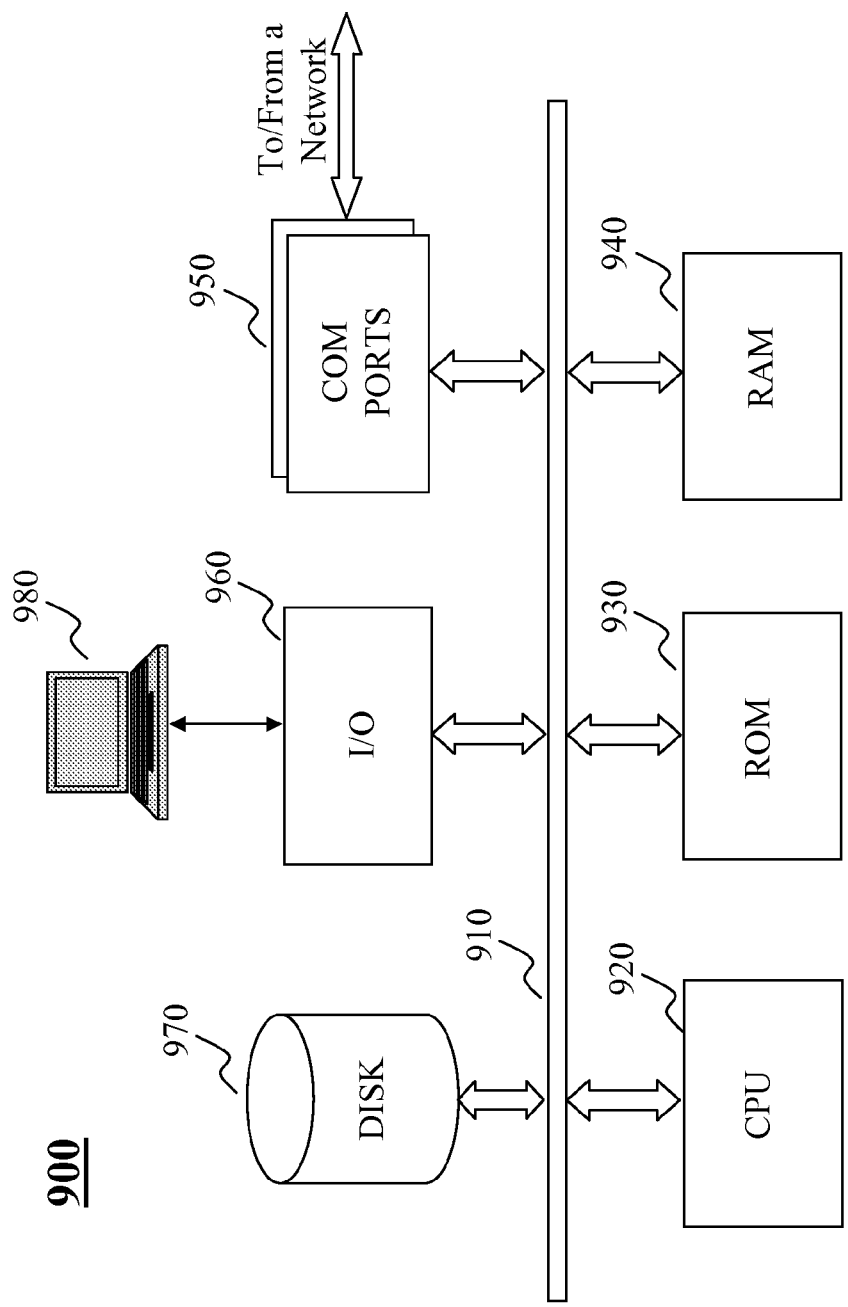
FIG. 9 depicts a general computer architecture on which the present teaching can be implemented.

FIG. 9 depicts a general computer architecture on which the present teaching can be implemented and has a functional block diagram illustration of a computer hardware platform which includes user interface elements. The computer may be a general purpose computer or a special purpose computer. This computer 900 can be used to implement any components of an information search/retrieval system based on unified information representation as described herein. Different components of the information search/retrieval system, e.g., as depicted in FIGS. 3(*a*), 4(*a*)-4(*b*), 5(*a*), 6, 7 and 8, can all be implemented on a computer such as computer 900, via its hardware, software program, firmware, or a combination thereof. Although only one such computer is shown, for convenience, the computer functions relating to information search/retrieval based on unified information representation may be implemented in a distributed fashion on a number of similar platforms, to distribute the processing load.

The computer 900, for example, includes COM ports 950 connected to and from a network connected thereto to facilitate data communications. The computer 900 also includes a central processing unit (CPU) 920, in the form of one or more processors, for executing program instructions. The exemplary computer platform includes an internal communication bus 910, program storage and data storage of different forms, e.g., disk 970, read only memory (ROM) 930, or random access memory (RAM) 940, for various data files to be processed and/or communicated by the computer, as well as possibly program instructions to be executed by the CPU. The computer 900 also includes an I/O component 960, supporting input/output flows between the computer and other components therein such as user interface elements 980. The computer 900 may also receive programming and data via network communications.

Hence, aspects of the method of managing heterogeneous data/metadata/processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for archiving a document, comprising the steps of:
    receiving a document via the communication platform;
    analyzing, by a feature extractor, the received document in accordance with at least one model to form a feature-based vector characterizing the document;
    generating, by a semantic extractor, a semantic-based representation of the document based on the feature-based vector, wherein the semantic-based representation has a reduced dimension;
    constructing, by a reconstruction unit, a reconstructed feature-based vector based on the semantic-based representation of the document, by mapping the semantic-based representation to a feature space of the feature-based vector;
    comparing, by a discrepancy analyzer, the feature-based vector with the reconstructed feature-based vector to identify a difference between the feature-based vector and the reconstructed feature-based vector;
    forming a residual feature-based representation of the document based on the difference between the feature-based vector and the reconstructed feature-based vector;
    generating, by a unified representation construction unit, a unified representation for the document based on the semantic-based representation and the residual feature-based representation; and
    archiving the document in an information archive based on the unified representation of the document.

2. The method of claim 1, wherein the at least one model includes an information model and a language model, wherein the feature-based vector according to the information model has a plurality of attributes, each of which represents a portion of information contained in the document allocated to an associated feature.

3. The method of claim 1, wherein the semantic extractor and the reconstruction unit are implemented based on an auto-encoder.

4. The method of claim 1, wherein the step of archiving comprises:
    computing, by an indexing system, at least one index value based on the unified representation for the document;
    establishing a link between the index value and the document archived in accordance with the unified representation of the document in the information archive.

5. The method of claim 1, further comprising forming a blurred feature-based representation of the document by modifying the feature-based vector based on the reconstructed feature-based vector.

6. The method of claim 5, wherein the step of modifying the feature-based vector comprises:
    obtaining a first attribute value from the feature-based vector;
    obtaining a second attribute value corresponding to the first attribute from the reconstructed feature-based vector; and
    computing a third attribute value as the corresponding attribute value of the blurred feature-based representation of the document based on the first and second attribute values.

7. The method of claim 5, wherein the unified representation for the document is constructed further based on the blurred feature-based representation of the document.

8. A method, implemented on a machine having at least one processor, storage, and a communication platform connected to a network for archiving a document, comprising the steps of:
    receiving a document via the communication platform;
    analyzing, by a feature extractor, the received document in accordance with at least one model to form a feature-based vector characterizing the document;
    generating, by a semantic extractor, a semantic-based representation of the document based on the feature-based vector, wherein the semantic-based representation has a reduced dimension;
    constructing, by a reconstruction unit, a reconstructed feature-based vector based on the semantic-based representation of the document, by mapping the semantic-based representation to a feature space of the feature-based vector;
    forming a blurred feature-based representation of the document based on a difference between the feature-based vector and the reconstructed feature-based vector;
    generating, by a unified representation construction unit, a unified representation for the document based on the blurred feature-based representation and the semantic-based representation; and
    archiving the document in an information archive based on the unified representation of the document.

9. The method of claim 8, further comprising:
    forming a residual feature-based representation of the document based on one or more features identified in accordance with discrepancy between the feature-based vector and the reconstructed feature-based vector; and
    incorporating, in the unified representation for the document, the semantic-based representation and the residual feature-based representation.

10. The method of claim 8, wherein the at least one model includes an information model and a language model, wherein the feature-based vector according to the information model has a plurality of attributes, each of which represents a portion of information contained in the document allocated to an associated feature.

11. The method of claim 8, wherein the semantic extractor and the reconstruction unit are implemented based on an auto-encoder.

12. A method, implemented on a machine having at least one processor, storage, and a communication platform connected to a network for search and retrieval of information archived based on a unified representation, comprising the steps of:
    obtaining a query via the communication platform;
    processing, by a query processor, the query to generate a feature-based vector characterizing the query;
    generating, by a semantic extractor, a semantic-based representation of the query based on the feature-based vector, wherein the semantic-based representation has a reduced dimension;
    constructing, by a reconstruction unit, a reconstructed feature-based vector based on the semantic-based representation of the query, by mapping the semantic-based representation to a feature space of the feature-based vector;
    comparing, by a discrepancy analyzer, the feature-based vector with the reconstructed feature-based vector to identify a difference between the feature-based vector and the reconstructed feature-based vector;
    forming a residual feature-based representation of the query based on the difference between the feature-based vector and the reconstructed feature-based vector;

generating, by a unified representation construction unit, a unified representation of the query based on the semantic-based representation and the residual feature-based representation;

retrieving, by a candidate search unit, information relevant to the query from an information archive based on the unified representation of the query;

generating, by a query response generator, a query response based on the information relevant to the query retrieved from the information archive; and transmitting the query response to respond to the query.

13. The method of claim 12, wherein the unified representation of the query further includes a blurred feature-based representation generated by modifying the feature-based vector based on the reconstructed feature-based vector.

14. The method of claim 12, wherein the step of retrieving comprises:
generating a first index value based on the unified representation of the query;
identifying a second index value stored in an indexing system of the information archive;
obtaining a group of information items in the information archive that have similar index values; and
selecting the information relevant to the query from the obtained group of information items.

15. A system having at least one processor, storage, and a communication platform for generating a unified representation for a document, comprising:
a communication platform through which a document can be received;
a feature extractor configured for analyzing the received document in accordance with at least one model to form a feature-based vector characterizing the document;
a semantic extractor configured for generating a semantic-based representation of the document based on the feature-based vector, wherein the semantic-based representation has a reduced dimension;
a reconstruction unit configured for producing a reconstructed feature-based vector based on the semantic-based representation of the document by mapping the semantic-based representation to a feature space of the feature-based vector;
a residual feature identifier configured for forming a residual feature-based representation of the document based on the difference between the feature-based vector and the reconstructed feature-based vector; and
a unified representation construction unit configured for generating a unified representation for the document based on the semantic-based representation and the residual feature-based representation.

16. The system of claim 15, wherein the at least one model includes an information model and a language model, wherein the feature-based vector built according to the information model has a plurality of attributes, each of which represents a portion of information contained in the document allocated to an associated feature.

17. The system of claim 15, wherein the semantic extractor and the reconstruction unit are implemented based on an auto-encoder.

18. The system of claim 15, further comprising a feature vector blurring unit configured for forming a blurred feature-based representation of the document by modifying the feature-based vector based on the reconstructed feature-based vector.

19. A system having at least one processor, storage, and a communication platform for search and retrieval of information archived based on a unified representation, comprising:

a communication platform for obtaining a query and transmitting a query response;
a query processor configured for processing the query to generate a feature-based vector characterizing the query;
a semantic extractor configured for generating a semantic-based representation of the query based on the feature-based vector, wherein the semantic-based representation has a reduced dimension;
a reconstruction unit configured to construct a reconstructed feature-based vector based on the semantic-based representation of the query by mapping the semantic-based representation to a feature space of the feature-based vector;
a residual feature identifier configured for forming a residual feature-based representation of the query based on the difference between the feature-based vector and the reconstructed feature-based vector;
a query representation generator configured for generating a unified representation for the query based on the semantic-based representation and the residual feature-based representation, wherein the unified representation integrates semantic and residual feature based characterizations of the query;
a candidate search unit configured for retrieving information relevant to the query from an information archive based on the unified representation for the query; and
a query response generator configured for generating the query response based on the information relevant to the query retrieved from the information archive and transmitting the query response to respond to the query.

20. A system having at least one processor, storage, and a communication platform for search and retrieval of information archived based on a unified representation, comprising:
a communication platform for obtaining a query and transmitting a query response;
a query processor configured for processing the query to generate a feature-based vector characterizing the query;
a semantic extractor configured for generating a semantic-based representation of the query based on the feature-based vector, wherein the semantic-based representation has a reduced dimension;
a reconstruction unit configured to construct a reconstructed feature-based vector based on the semantic-based representation of the query by mapping the semantic-based representation to a feature space of the feature-based vector;
a feature vector blurring unit configured for generating a blurred feature-based representation of the query based on a difference between the feature-based vector and the reconstructed feature-based vector;
a query representation generator configured for generating a unified representation for the query based on the semantic-based representation and the blurred feature-based representation;
a candidate search unit configured for retrieving information relevant to the query from an information archive based on the unified representation for the query; and
a query response generator configured for generating the query response based on the information relevant to the query retrieved from the information archive and transmitting the query response to respond to the query.

21. A machine-readable non-transitory medium having information recorded thereon related to document archiving, the information, when read by the machine, causes the machine to perform the following:

receiving a document via a communication platform;

analyzing the received document in accordance with at least one model to form a feature-based vector characterizing the document;

generating a semantic-based representation of the document based on the feature-based vector, wherein the semantic-based representation has a reduced dimension;

constructing a reconstructed feature-based vector based on the semantic-based representation of the document, by mapping the semantic-based representation to a feature space of the feature-based vector;

comparing the feature-based vector with the reconstructed feature-based vector to identify a difference between the feature-based vector and the reconstructed feature-based vector;

forming a residual feature-based representation of the document based on the difference between the feature-based vector and the reconstructed feature-based vector;

generating a unified representation for the document based on the semantic-based representation and the residual feature-based representation; and archiving the document in an information archive based on the unified representation of the document.

22. The medium of claim 21, wherein the at least one model includes an information model and a language model, wherein the feature-based vector according to the information model has a plurality of attributes, each of which represents a portion of information contained in the document allocated to an associated feature.

23. The medium of claim 21, wherein the semantic extractor and the reconstruction unit are implemented based on an auto-encoder.

24. The medium of claim 21, wherein the information, when read by the machine, further causes the machine to perform the following:

forming a blurred feature-based representation of the document by modifying the feature-based vector based on the reconstructed feature-based vector; and incorporating the blurred feature-based representation of the document as part of the unified representation for the document.

25. A machine-readable non-transitory medium having information recorded thereon for document archiving, the information, when read by the machine, causes the machine to perform the following:

receiving a document via a communication platform;

analyzing the received document in accordance with at least one model to form a feature-based vector characterizing the document;

generating a semantic-based representation of the document based on the feature-based vector, wherein the semantic-based representation has a reduced dimension;

constructing a reconstructed feature-based vector based on the semantic-based representation of the document, by mapping the semantic-based representation to a feature space of the feature-based vector;

forming a blurred feature-based representation of the document based on a difference between the feature-based vector and the reconstructed feature-based vector;

generating a unified representation for the document based on the blurred feature-based representation and the semantic-based representation; and archiving the document in an information archive based on the unified representation of the document.

26. The medium of claim 25, wherein the information, when read by the machine, further causes the machine to perform the following:

forming a residual feature-based representation of the document based on one or more features identified in accordance with discrepancy between the feature-based vector and the reconstructed feature-based vector; and incorporating, in the unified representation for the document, the semantic-based representation and the residual feature-based representation.

27. The medium of claim 25, wherein the at least one model includes an information model and a language model, wherein the feature-based vector according to the information model has a plurality of attributes, each of which represents a portion of information contained in the document allocated to an associated feature.

28. The medium of claim 25, wherein the semantic extractor and the reconstruction unit are implemented based on an auto-encoder.

29. A machine-readable non-transitory medium having information recorded thereon for information search and retrieval, when read by the machine, causes the machine to perform the following:

obtaining a query via a communication platform;

processing the query to generate a feature-based vector characterizing the query;

generating a semantic-based representation of the query based on the feature-based vector, wherein the semantic-based representation has a reduced dimension;

constructing a reconstructed feature-based vector based on the semantic-based representation of the query, by mapping the semantic-based representation to a feature space of the feature-based vector;

comparing the feature-based vector with the reconstructed feature-based vector to identify a difference between the feature-based vector and the reconstructed feature-based vector;

forming a residual feature-based representation of the query based on the difference between the feature-based vector and the reconstructed feature-based vector;

generating a unified representation of the query based on the semantic-based representation and the residual feature-based representation, wherein the unified representation integrates semantic and residual feature based characterizations of the query;

retrieving information relevant to the query from an information archive based on the unified representation of the query;

generating a query response based on the information relevant to the query retrieved from the information archive; and transmitting the query response to respond to the query.

30. The medium of claim 29, wherein the unified representation of the query further includes a blurred feature-based representation generated by modifying the feature-based vector based on the reconstructed feature-based vector.

31. The medium of claim 29, wherein the step of retrieving comprises:

generating a first index value based on the unified representation of the query;

identifying a second index value stored in an indexing system of the information archive;

obtaining a group of information items in the information archive that have similar index values; and selecting the information relevant to the query from the obtained group of information items.

* * * * *